US009893380B2

(12) United States Patent
Kuo et al.

(10) Patent No.: US 9,893,380 B2
(45) Date of Patent: Feb. 13, 2018

(54) POLYMERIC IONIC LIQUID AND PROCESS FOR PRODUCING A POLYMER MEMBRANE INCLUDING THE SAME

(71) Applicants: NATIONAL CHENG KUNG UNIVERSITY, Tainan (TW); RISING CHEMICAL CO., LTD., Tainan (TW)

(72) Inventors: Ping-Lin Kuo, Tainan (TW); Szu-Ting Chen, Tainan (TW); Huang-Ming Hsu, Tainan (TW); Chih-Hao Tsao, Tainan (TW); Chun-Han Hsu, Tainan (TW); Li-Hsuan Chien, Tainan (TW)

(73) Assignees: NATIONAL CHENG KUNG UNIVERSITY, Tainan (TW); RISING CHEMICAL CO., LTD., Tainan (TW)

( * ) Notice: Subject to any disclaimer, the term of this patent is extended or adjusted under 35 U.S.C. 154(b) by 0 days.

(21) Appl. No.: 14/867,946

(22) Filed: Sep. 28, 2015

(65) Prior Publication Data

US 2017/0092982 A1    Mar. 30, 2017

(51) Int. Cl.
*H01M 6/16*    (2006.01)
*C08F 20/10*   (2006.01)
(Continued)

(52) U.S. Cl.
CPC ......... *H01M 10/0565* (2013.01); *B01J 41/13* (2017.01); *C08G 59/02* (2013.01);
(Continued)

(58) Field of Classification Search
USPC ................................................. 429/341, 207
See application file for complete search history.

(56) References Cited

U.S. PATENT DOCUMENTS

2012/0259044 A1\* 10/2012 Henningsen ......... C08G 59/686
523/466
2013/0244035 A1\* 9/2013 Greinert .................. G02F 1/167
428/402
(Continued)

OTHER PUBLICATIONS

Döbbelin et al; "Synthesis of Pyrrolidinum-Based Poly(ionic liquid) Electrolytes with Poly(ethylene glycol) Slide Chains"; ASC Publications; Mar. 30, 2012; pp. 1583-1590.
Pont et al; "Pyrrolidinium-based Polymeric Ionic Liquids as Mechanically and Electrochemically Stable Polymer Electrolytes"; Elsevier—Journal of Power Sources; Nov. 28, 2008; pp. 558-563.
(Continued)

*Primary Examiner* — Mark Kaucher
*Assistant Examiner* — Henry Hu
(74) *Attorney, Agent, or Firm* — Ohlandt, Greeley, Ruggiero & Perle, LLP

(57) ABSTRACT

A polymeric ionic liquid has a formula (I), $$\left[ Z-\underset{A_1}{\bigcirc}-Q-\underset{A_2}{\bigcirc}-B-\underset{A_1}{\bigcirc}-Q-\underset{A_2}{\bigcirc}-Z \right]_k$$

where $A_1$, $A_2$, B, k, Q, and Z are as defined in the specification. An intermediate polymer for making the polymeric ionic liquid, a process for producing the polymeric ionic liquid, a process for producing a polymer membrane including the polymeric ionic liquid, a process for preparing a gel polymer electrolyte including the polymer membrane, and a binder including the polymeric ionic liquid are also disclosed.

11 Claims, 21 Drawing Sheets

(51) Int. Cl.
    *H01M 10/0565*     (2010.01)
    *C08G 59/02*     (2006.01)
    *H01M 4/62*     (2006.01)
    *H01M 10/0525*     (2010.01)
    *H01M 10/0568*     (2010.01)
    *B01J 41/13*     (2017.01)

(52) U.S. Cl.
    CPC ....... *H01M 4/622* (2013.01); *H01M 10/0525* (2013.01); *H01M 10/0568* (2013.01); *H01M 2300/0045* (2013.01); *H01M 2300/0082* (2013.01); *H01M 2300/0085* (2013.01)

(56) References Cited

U.S. PATENT DOCUMENTS

| | | | | |
|---|---|---|---|---|
| 2015/0104165 | A1* | 4/2015 | Kim | C09K 19/38 |
| | | | | 396/529 |
| 2015/0353832 | A1* | 12/2015 | Xu | C09K 21/12 |
| | | | | 252/607 |
| 2016/0107154 | A1* | 4/2016 | Masel | B01J 41/14 |
| | | | | 252/62.2 |
| 2016/0251766 | A1* | 9/2016 | Masel | C02F 1/461 |

OTHER PUBLICATIONS

Kim et al; :Improving the Stability of an Organic Battery with an Ionic Liquid-based Polymer Electrolyte; The Royal Society of Chemistry; Aug. 24, 2012; pp. 9795-9797.

\* cited by examiner

EX 38 (30% PIL-TFSI anion)

EX 39 (50% PIL-TFSI anion)

CE 4 (PVdF-co-HFP)

POLYMERIC IONIC LIQUID AND PROCESS FOR PRODUCING A POLYMER MEMBRANE INCLUDING THE SAME

FIELD OF THE INVENTION

This invention relates to a polymeric ionic liquid, an intermediate polymer for making the polymeric ionic liquid, a process for producing the polymeric ionic liquid, a process for producing a polymer membrane including the polymeric ionic liquid, a process for preparing a gel polymer electrolyte including the polymer membrane, and a binder including the polymeric ionic liquid.

BACKGROUND OF THE INVENTION

Conventional polymeric ionic liquids are disclosed in, for example, (1) Anne-Laure Pont et al., "Pyrrolidinium-based polymeric ionic liquids as mechanically and electrochemically stable polymer electrolytes," Journal of Power Sources 188 (2009) 558-563, (2) Markus Döbbelin et al., "Synthesis of pyrrolidinium-based poly(ionic liquid) electrolytes with poly(ethylene glycol) side chains," Chemistry of Materials (2012) 24, 1583-1590, and (3) Jae-Kwang Kim et al., "Improving the stability of an organic battery with an ionic liquid-based polymer electrolyte," RSC Advances, 2012, 2, 9795-9797.

SUMMARY OF THE INVENTION

An object of the present invention is to provide a novel polymeric ionic liquid, an intermediate polymer for making the polymeric ionic liquid, a process for producing the polymeric ionic liquid, a process for producing a polymer membrane including the polymeric ionic liquid, a process for preparing a gel polymer electrolyte including the polymer membrane, and a binder including the polymeric ionic liquid. The gel polymer electrolyte can be used in a lithium battery to act as an ionic conductor as well as a separator that separates an anode and a cathode of the lithium battery.

According to a first aspect of this invention, a polymeric ionic liquid has a formula (I),

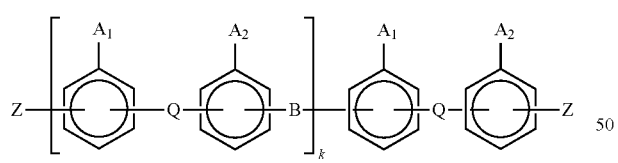

(I)

where:
Q is

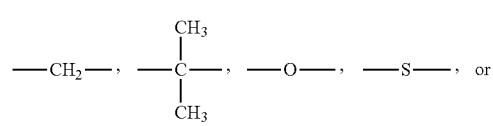

$k$ is an integral not less than zero;

B is

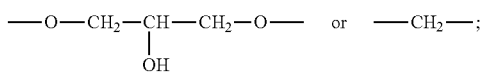

$A_1$ and $A_2$ which are independently selected for each repeating unit, which are independently alkyl or a hydrogen atom when B is

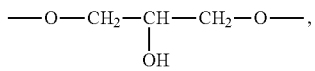

and which are independently

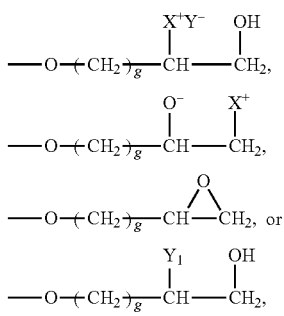

when each of B and Q is —$CH_2$—, in which g is an integral not less than 1, $Y^-$ is $PF_6^-$, $BF_4^-$,

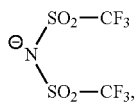

$ClO_4^-$, or a halide anion, $Y_1$ is a halogen atom, and $X^+$ is

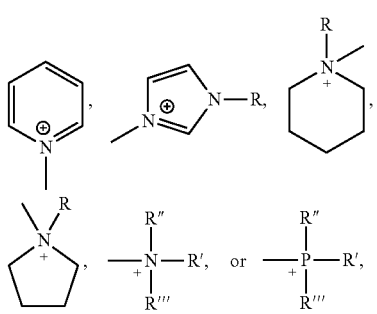

in which R, R', R", R'" are each independently —$CH_3$, —$CH_2CH_3$, —$CH_2CH_2CH_3$, —$CH_2CH_2CH_2CH_3$, —$CH_2CH_2OCH_3$, or —$CH_2CH_2OCH_2CH_2OCH_3$, with the proviso that in at least one repeating unit, at least one of $A_1$ and $A_2$ is not

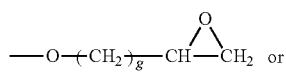 or

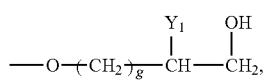, with the proviso that when $A_1$ is

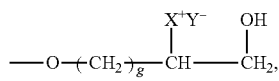, $A_2$ is not

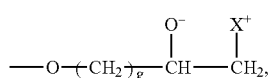, and with the proviso that when $A_1$ is

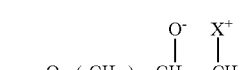, $A_2$ is not

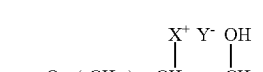;

and
Z is alkyl or a hydrogen atom when each of B and Q is —CH$_2$—, and is

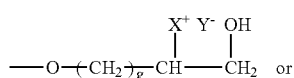 or

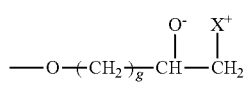

when B is

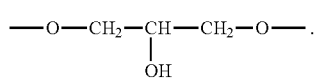.

According to a second aspect of this invention, an intermediate polymer for making a polymeric ionic liquid has a formula (II),

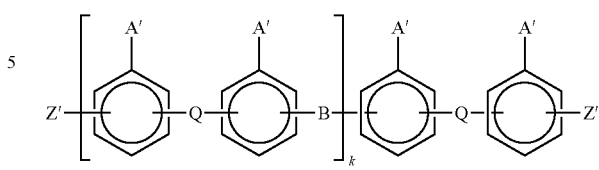 (II)

where:
Q is

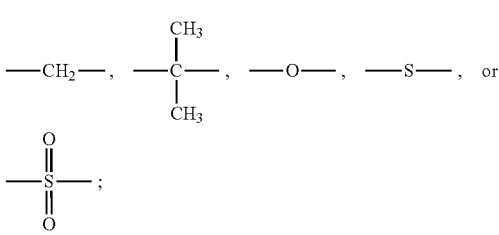

$$-\underset{\underset{O}{\|}}{\overset{\overset{O}{\|}}{S}}-;$$

k is an integral not less than zero;
B is

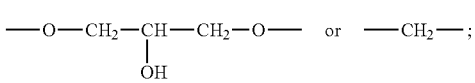 or —CH$_2$—;

A' is alkyl or a hydrogen atom when B is

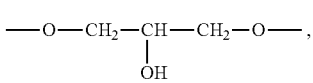, and is

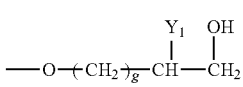

when each of B and Q is —CH$_2$—, in which g is an integral not less than 1, and $Y_1$ is a halogen atom; and
Z' is alkyl or a hydrogen atom when each of B and Q is —CH$_2$—, and is

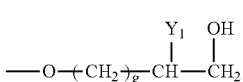

when B is

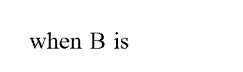.

According to a third aspect of this invention, a process for producing a polymeric ionic liquid includes the steps of:
(a) preparing a phenolic epoxy resin having a formula (III)

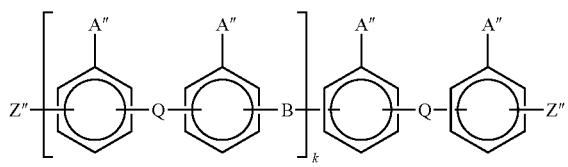

(III)

where
Q is

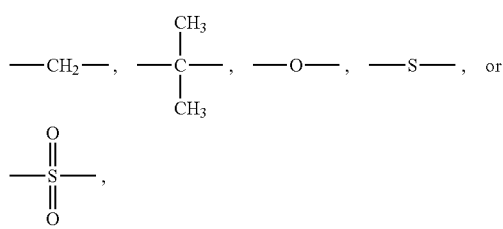

k is an integral not less than zero,
B is

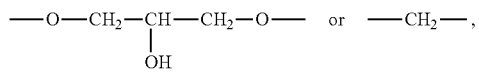

A″ is alkyl or a hydrogen atom when B is

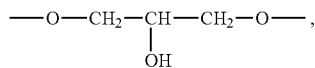

and is

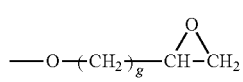

when each of B and Q is —CH$_2$—, in which g is an integral not less than 1, and
Z″ is alkyl or a hydrogen atom when each of B and Q is —CH$_2$—, and is

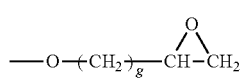

when B is

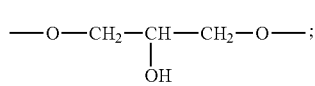

and
(b) subjecting the phenolic epoxy resin to a ring opening reaction using a first compound which is selected from the group consisting of hydrogen halide, substituted or non-substituted pyridine, substituted or non-substituted imidazole, substituted or non-substituted piperidine, substituted or non-substituted pyrrolidine, tertiary amine, tertiary phosphine, and combinations thereof.

According to a fourth aspect of this invention, a process for producing a polymer membrane includes the steps of:
(i) preparing a prepolymer having a formula (IV)

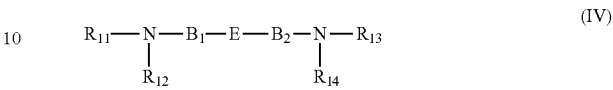

where
B$_1$ and B$_2$ are independently an alkylene group or an arylene group,
R$_{11}$, R$_{12}$, R$_{13}$, and R$_{14}$ are independently H or alkyl, and
E is —CH$_2$— when B$_1$ and B$_2$ are the arylene group or —O—(X$_1$)$_n$— when B$_1$ and B$_2$ are the alkylene group, in which n is an integral not less than zero, and X$_1$ is represented by

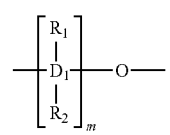

and is independently selected for each repeating unit, in which
D$_1$ is a carbon atom or a silicon atom,
R$_1$ and R$_2$ are independently —CH$_3$, H, or F when D$_1$ is a carbon atom, and are independently —CH$_3$, -phenyl, —OCH$_3$, or —OC$_2$H$_5$ when D$_1$ is a silicon atom, and
m is 1 or 2; and
(ii) using a crosslinking agent to bridge the prepolymer, the crosslinking agent having a formula (III),

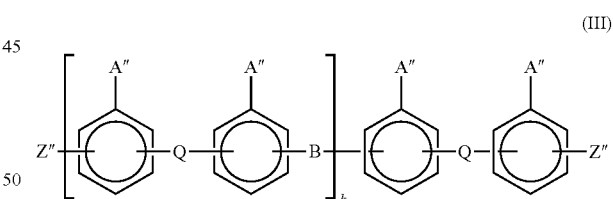

where
Q is

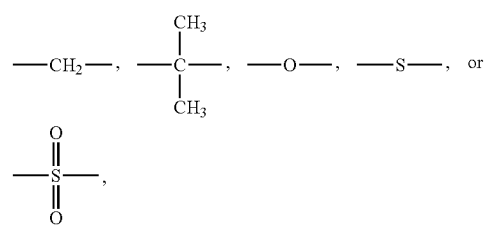

k is an integral not less than zero,

B is

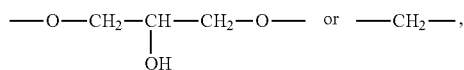

A″ is alkyl or a hydrogen atom when B is

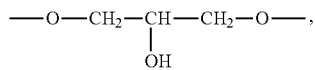

and is

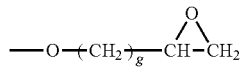

when each of B and Q is —CH$_2$—, in which g is an integral not less than 1, and Z″ is alkyl or a hydrogen atom when each of B and Q is —CH$_2$—, and is

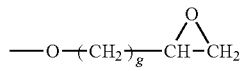

when B is

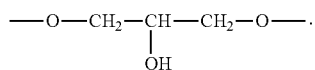

According to a fifth aspect of this invention, a process for preparing a gel polymer electrolyte includes a step of soaking the polymer membrane with a lithium-ion containing electrolyte.

According to a sixth aspect of this invention, a process for preparing a gel polymer electrolyte includes a step of soaking a polymer membrane including the polymeric ionic liquid with a lithium-ion containing electrolyte.

According to a seventh aspect of this invention, a binder for a lithium battery electrode includes the polymeric ionic liquid.

According to an eighth aspect of this invention, a polymeric ionic liquid has a formula (VI),

where:
k1 and g are each an integral not less than 1; and
$Z_1$ and $Z_2$ are each independently

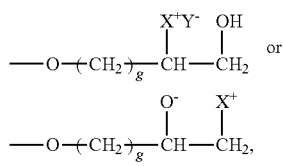

in which Y$^-$ is PF$_6^-$, BF$_4^-$,

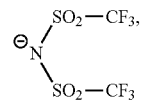

ClO$_4^-$, or a halide anion, and X$^+$ is

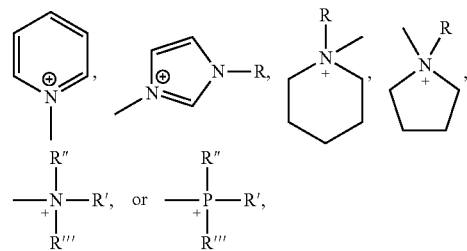

in which R, R′, R″, R‴ are each independently —CH$_3$, —CH$_2$CH$_3$, —CH$_2$CH$_2$CH$_3$, —CH$_2$CH$_2$CH$_2$CH$_3$, —CH$_2$CH$_2$OCH$_3$, or —CH$_2$CH$_2$OCH$_2$CH$_2$OCH$_3$.

BRIEF DESCRIPTION OF THE DRAWINGS

Other features and advantages of the present invention will become apparent in the following detailed description of the embodiments of the invention, with reference to the accompanying drawings, in which.

DETAILED DESCRIPTION OF THE EMBODIMENTS

Figure 1:
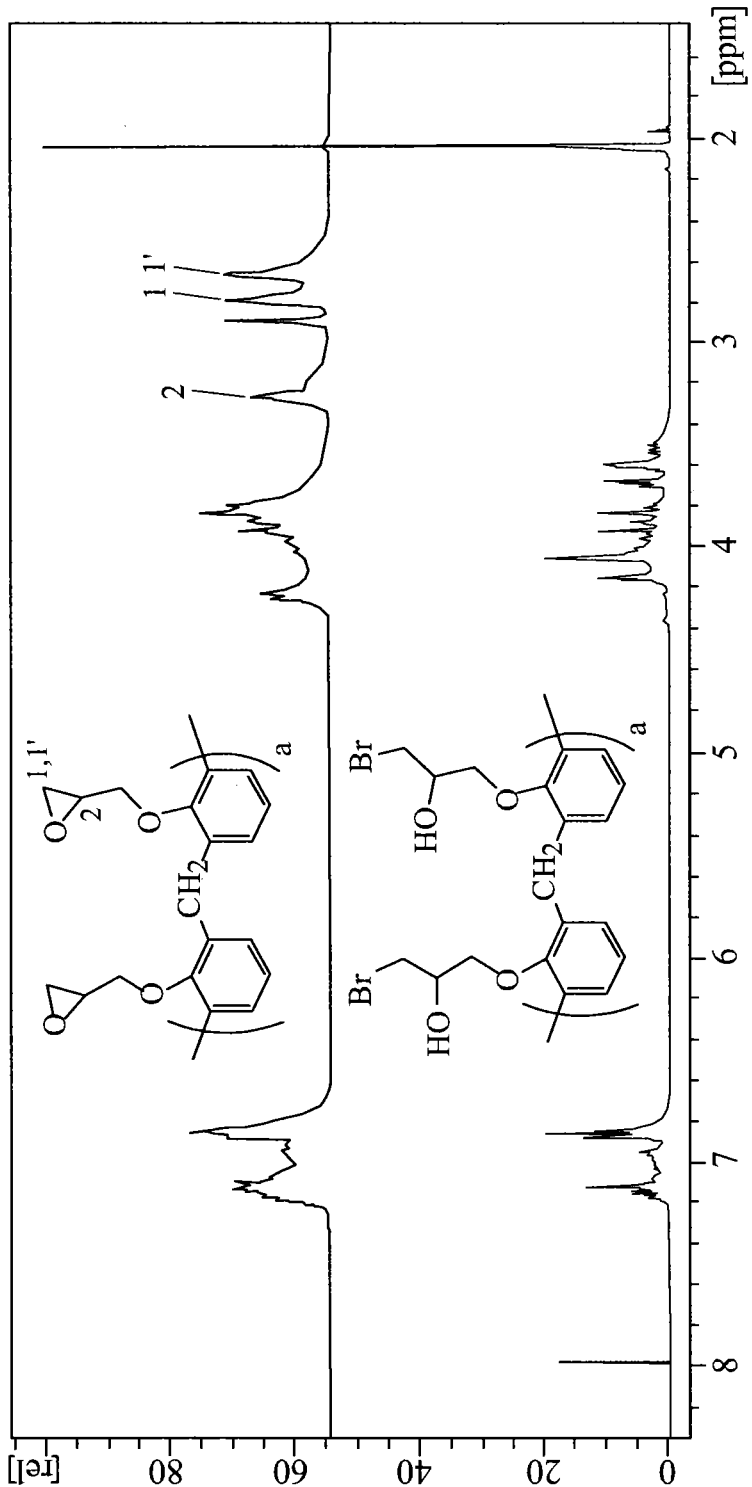
FIG. 1 shows a $^1$H-NMR spectrum for a purified phenolic epoxy resin and a brominated intermediate polymer obtained in Example 1.

A polymeric ionic liquid according to an embodiment of the present invention has a formula (I), $$\left[ Z - \underset{A_1}{\underset{|}{\bigcirc}} - Q - \underset{A_2}{\underset{|}{\bigcirc}} - B \right]_k \underset{A_1}{\underset{|}{\bigcirc}} - Q - \underset{A_2}{\underset{|}{\bigcirc}} - Z \quad (I)$$

where:

Q is

—CH$_2$—, —C(CH$_3$)$_2$—, —O—, —S—, or $$\underset{\overset{\|}{O}}{\overset{\overset{\|}{O}}{-S-}};$$

k is an integral not less than zero;

B is

—O—CH$_2$—CH(OH)—CH$_2$—O— or —CH$_2$—;

A$_1$ and A$_2$ which are independently selected for each repeating unit, which are independently alkyl or a hydrogen atom when B is

—O—CH$_2$—CH(OH)—CH$_2$—O—, and which are independently

—O—(CH$_2$)$_g$—CH(X$^+$Y$^-$)—CH$_2$(OH), —O—(CH$_2$)$_g$—CH(O$^-$)—CH$_2$(X$^+$),

—O—(CH$_2$)$_g$—CH—CH$_2$ (epoxide), or

—O—(CH$_2$)$_g$—CH(Y$_1$)—CH$_2$(OH)

when each of B and Q is —CH$_2$—, in which g is an integral not less than 1, Y$^-$ is PF$_6^-$, BF$_4^-$, $$\overset{\ominus}{N}\underset{SO_2-CF_3}{\overset{SO_2-CF_3}{\diagup}},$$

ClO$_4^-$, or a halide anion, Y$_1$ is a halogen atom, and X$^+$ is

[pyridinium], [imidazolium N-R], [piperidinium with R], [pyrrolidinium with R], $$-\underset{\underset{R'''}{|}}{\overset{\overset{R''}{|}}{N^+}}-R', \text{ or } -\underset{\underset{R'''}{|}}{\overset{\overset{R''}{|}}{P^+}}-R',$$

in which R, R', R", R'" are each independently —CH$_3$, —CH$_2$CH$_3$, —CH$_2$CH$_2$CH$_3$, —CH$_2$CH$_2$CH$_2$CH$_3$, —CH$_2$CH$_2$OCH$_3$, or —CH$_2$CH$_2$OCH$_2$CH$_2$OCH$_3$, with the proviso that in at least one repeating unit, at least one of A$_1$ and A$_2$ is not —O—(CH$_2$)$_g$—CH—CH$_2$ (epoxide) or —O—(CH$_2$)$_g$—CH(Y$_1$)—CH$_2$(OH), with the proviso that when A$_1$ is —O—(CH$_2$)$_g$—CH(X$^+$Y$^-$)—CH$_2$(OH), A$_2$ is not —O—(CH$_2$)$_g$—CH(O$^-$)—CH$_2$(X$^+$), and with the proviso that when A$_1$ is —O—(CH$_2$)$_g$—CH(O$^-$)—CH$_2$(X$^+$), A$_2$ is not —O—(CH$_2$)$_g$—CH(X$^+$Y$^-$)—CH$_2$(OH);

and

Z is alkyl or a hydrogen atom when each of B and Q is —CH$_2$—, and is $$-\text{O}-(\text{CH}_2)_g-\overset{X^+ Y^-}{\underset{|}{\text{CH}}}-\overset{\text{OH}}{\underset{|}{\text{CH}_2}} \quad \text{or}$$

$$-\text{O}-(\text{CH}_2)_g-\overset{\text{O}^-\ X^+}{\underset{|}{\text{CH}}}-\overset{X^+}{\underset{|}{\text{CH}_2}}$$

when B is $$-\text{O}-\text{CH}_2-\underset{\underset{\text{OH}}{|}}{\text{CH}}-\text{CH}_2-\text{O}-.$$

Preferably, Q is $$-\text{CH}_2- \quad \text{or} \quad -\underset{\underset{\text{CH}_3}{|}}{\overset{\overset{\text{CH}_3}{|}}{\text{C}}}-.$$

More preferably, each of B and Q is —CH$_2$—, Z is a hydrogen atom, and A$_1$ and A$_2$ are independently $$-\text{O}-(\text{CH}_2)_g-\overset{X^+ Y^-}{\underset{|}{\text{CH}}}-\overset{\text{OH}}{\underset{|}{\text{CH}_2}} \quad \text{or}$$

$$-\text{O}-(\text{CH}_2)_g-\overset{Y_1}{\underset{|}{\text{CH}}}-\overset{\text{OH}}{\underset{|}{\text{CH}_2}}$$

in which g=1.

Preferably, Y$_1$ is a bromine atom or a chlorine atom.

An intermediate polymer according to an embodiment of this invention is used for making the polymeric ionic liquid, and has a formula (II), (II)

$$Z'-\left[\left\{\overset{A'}{\underset{}{\bigcirc}}\right\}-Q-\left\{\overset{A'}{\underset{}{\bigcirc}}\right\}-B\right]_k-\left\{\overset{A'}{\underset{}{\bigcirc}}\right\}-Q-\left\{\overset{A'}{\underset{}{\bigcirc}}\right\}-Z'$$

where:
Q, k, and B are as defined above;
A' is alkyl or a hydrogen atom when B is $$-\text{O}-\text{CH}_2-\underset{\underset{\text{OH}}{|}}{\text{CH}}-\text{CH}_2-\text{O}-,$$

and is $$-\text{O}-(\text{CH}_2)_g-\overset{Y_1}{\underset{|}{\text{CH}}}-\overset{\text{OH}}{\underset{|}{\text{CH}_2}}$$

when each of B and Q is —CH$_2$—, in which g and Y$_1$ are as defined above; and Z' is alkyl or a hydrogen atom when each of B and Q is —CH$_2$—, and is $$-\text{O}-(\text{CH}_2)_g-\overset{Y_1}{\underset{|}{\text{CH}}}-\overset{\text{OH}}{\underset{|}{\text{CH}_2}}$$

when B is $$-\text{O}-\text{CH}_2-\underset{\underset{\text{OH}}{|}}{\text{CH}}-\text{CH}_2-\text{O}-.$$

Preferably, each of B and Q is —CH$_2$—, Z' is a hydrogen atom, and A' is $$-\text{O}-(\text{CH}_2)_g-\overset{Y_1}{\underset{|}{\text{CH}}}-\overset{\text{OH}}{\underset{|}{\text{CH}_2}}$$

in which g=1 and Y$_1$ is a bromine atom or a chlorine atom.

A process for producing the polymeric ionic liquid according to an embodiment of the present invention includes steps (a) and (b).

In step (a), a phenolic epoxy resin having a formula (III) is prepared, (III)

$$Z''-\left[\left\{\overset{A''}{\underset{}{\bigcirc}}\right\}-Q-\left\{\overset{A''}{\underset{}{\bigcirc}}\right\}-B\right]_k-\left\{\overset{A''}{\underset{}{\bigcirc}}\right\}-Q-\left\{\overset{A''}{\underset{}{\bigcirc}}\right\}-Z''$$

where
Q, k, and B are as defined above,
A'' is alkyl or a hydrogen atom when B is $$-\text{O}-\text{CH}_2-\underset{\underset{\text{OH}}{|}}{\text{CH}}-\text{CH}_2-\text{O}-,$$

and is $$-\text{O}-(\text{CH}_2)_g-\overset{\overset{\text{O}}{\triangle}}{\text{CH}-\text{CH}_2}$$

when each of B and Q is —CH$_2$—, in which g is as defined above, and

Z'' is alkyl or a hydrogen atom when each of B and Q is —CH$_2$—, and is $$-\text{O}-(\text{CH}_2)_g-\overset{\overset{\text{O}}{\triangle}}{\text{CH}-\text{CH}_2}$$

when B is $$-O-CH_2-CH(OH)-CH_2-O-$$

Preferably, each of B and Q is —$CH_2$—, Z" is a hydrogen atom, and A' is $$-O-(CH_2)_g-CH-CH_2 \text{ (epoxide)}$$

in which g=1.

In step (b), the phenolic epoxy resin is subjected to a ring opening reaction using a first compound. The first compound is selected from the group consisting of hydrogen halide, substituted or non-substituted pyridine, substituted or non-substituted imidazole, substituted or non-substituted piperidine, substituted or non-substituted pyrrolidine, tertiary amine, tertiary phosphine, and combinations thereof.

Preferably, in step (b), the first compound is hydrogen halide, and is used in the ring opening reaction to thereby obtain the intermediate polymer having the above formula (II). More preferably, hydrogen halide is hydrogen chloride or hydrogen bromide.

Preferably, the process for producing the polymeric ionic liquid further includes steps (c) and (d).

In step (c), the intermediate polymer is reacted with a second compound to obtain a polymeric ionic liquid precursor which has halide anions. The second compound is selected from the group consisting of substituted or non-substituted pyridine, substituted or non-substituted imidazole, substituted or non-substituted piperidine, substituted or non-substituted pyrrolidine, tertiary amine, tertiary phosphine, and combinations thereof.

In step (d), the polymeric ionic liquid precursor is subjected to an anion replacement reaction using an alkali metal salt so as to obtain a second polymeric ionic liquid.

The alkali metal salt is selected from the group consisting of potassium hexafluorophosphate ($KPF_6$), bis(trifluoromethane)sulfonimide lithium salt (LiTFSI), lithium tetrafluoroborate ($LiBF_4$), dodecylbenzene sulfonic acid sodium salt (NaDBSA), lithium trifluoromethanesulfonate ($LiCF_3SO_3$), and combinations thereof. Potassium hexafluorophosphate ($KPF_6$) and bis(trifluoromethane)sulfonimide lithium salt (LiTFSI) are preferable.

A process for producing a polymer membrane according to an embodiment of this invention includes steps (i) and (ii).

In step (i), a prepolymer having a formula (IV) is prepared, $$R_{11}-N(R_{12})-B_1-E-B_2-N(R_{14})-R_{13} \quad (IV)$$

where
$B_1$ and $B_2$ are independently an alkylene group or an arylene group,
$R_{11}$, $R_{12}$, $R_{13}$, and $R_{14}$ are independently H or alkyl, and E is —$CH_2$— when $B_1$ and $B_2$ are the arylene group or —O-(-$X_1$-)$_n$— when $B_1$ and $B_2$ are the alkylene group, in which n is an integral not less than zero, and $X_1$ is represented by $$-[D_1(R_1)(R_2)]_m-O-$$

and is independently selected for each repeating unit, in which $D_1$ is a carbon atom or a silicon atom, $R_1$ and $R_2$ are independently —$CH_3$, H, or F when $D_1$ is a carbon atom, and are independently —$CH_3$, -phenyl, —$OCH_3$, or —$OC_2H_5$ when $D_1$ is a silicon atom, and m is 1 or 2.

In step (ii), a crosslinking agent having the above formula (III) is used to bridge the prepolymer.

In this embodiment, E is —O-(-$X_1$-)$_n$-, and $B_1$ and $B_2$ are independently represented by $$-C(R_a)(R_g)-C(R_b)(R_c)-$$

in which $R_a$, $R_b$, $R_c$, and $R_d$ are independently H or alkyl. An example of the prepolymer is polyetheramine having a formula (V), $$H_2N-CHCH_2-O-(CHCH_2-O)_x-(CH_2CH_2O)_y-(CH_2CHO)_z-CH_2CH-NH_2 \quad (V)$$
(with $CH_3$ groups)

where each of x, y, and z is an integral not less than zero.

In an example of this invention, in step (ii), the bridging reaction of the prepolymer is conducted in the presence of a polymeric ionic liquid having the above formula (I).

A process for preparing a gel polymer electrolyte according to an embodiment of the present invention includes a step of soaking a polymer membrane with a lithium-ion containing electrolyte.

The polymer membrane can be the above-described polymer membrane or another polymer membrane including the polymeric ionic liquid having the above formula (I).

Preferably, the lithium-ion containing electrolyte includes lithium hexafluorophosphate ($LiPF_6$).

A lithium battery according to an embodiment of the present invention includes an anode, a cathode, and the above-mentioned gel polymer electrolyte, which is disposed between the anode and the cathode. In this embodiment, the lithium battery is a lithium-ion rechargeable battery, which uses lithium iron phosphate ($LiFePO_4$) as a cathode material, and a lithium metal as an anode material.

A binder for a lithium battery electrode according to an embodiment of the present invention includes the above-mentioned polymeric ionic liquid.

The present invention will now be explained in more detail below by way of the following examples and comparative examples.

Polymeric Ionic Liquid

EXAMPLE 1 (EX 1)

Phenolic epoxy resin (PNE 177, Chang Chun Plastics, average molecular weight 1600 g $mol^{-1}$, EEW 172-182 g eq$^{-1}$) was dissolved in chloroform (Tedia, 99.9%) at room temperature to obtain a chloroform solution. To the chloroform solution, hexane (Seedchem, 95%) was added dropwise to dissolve impurities in an upper hexane layer. The upper hexane layer was removed, and then hexane was further added dropwise to the chloroform solution. The steps of addition and removal of hexane were repeated several times. Thereafter, the chloroform solvent in the chloroform solution (a lower layer solution) was removed using a rotary evaporator to obtain a purified phenolic epoxy resin.

The purified phenolic epoxy resin (10 g) was placed in a pear-shaped flask, and was dissolved in chloroform (Tedia, 99.9%) at room temperature. Then, the pear-shaped flask was disposed in an ice bath, and 10 ml of hydrobromic acid (Acros Organics, 48.0%) was slowly added into the pear-shaped flask to obtain a reaction mixture. A ring-opening bromination reaction of the purified phenolic epoxy resin was allowed to proceed, with stirring of the reaction mixture for 6 hours. Thereafter, the reaction mixture was washed using water to remove unreacted hydrobromic acid, and then the solvent (chloroform) in the reaction mixture was removed using a rotary evaporator (Rotavapor) to obtain a brominated intermediate polymer.

In another pear-shaped flask, the brominated intermediate polymer (5 g) was dissolved in dimethyl sulfoxide (DMSO) at room temperature, and then mixed with 7 ml of 1-methylimidazole (Alfa Aesar, 99.0%) at 80° C. to obtain a mixture. The mixture was stirred for 24 hours. To the mixture, ethyl acetate (a solvent) was added to dissolve unreacted reactants in the mixture. Next, the solvent was removed using a rotary evaporator so as to obtain a polymeric ionic liquid with counter-ions of bromide ions (PIL-Br anion).

The PIL-Br anion was dissolved in deionized water at room temperature to obtain a PIL solution. Potassium hexafluorophosphate (KPF$_6$) was dissolved in deionized water at room temperature to obtain a KPF$_6$ solution. The KPF$_6$ solution was added dropwise to the PIL solution and mixed therewith for 6 hours to obtain a precipitate. The precipitate was washed using water to remove unreacted reactants, was dried using a rotary evaporator, and then further dried in a vacuum oven so as to obtain a polymeric ionic liquid with counter-ions of hexafluorophosphate anions (PIL-PF$_6$ anion).

The scheme for synthesizing the polymer ionic liquid of Example 1 is shown below.

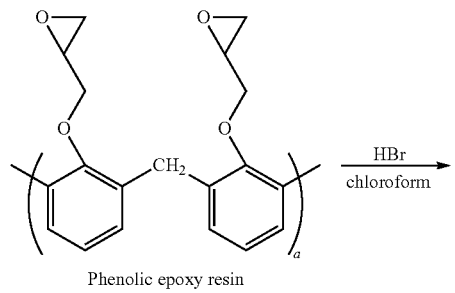

Phenolic epoxy resin

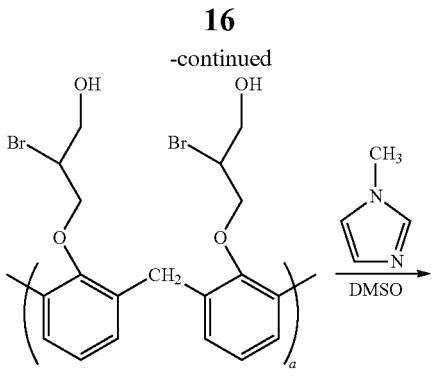

Brominated intermediate polymer

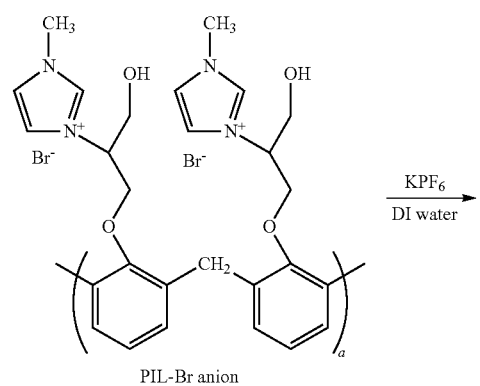

PIL-Br anion

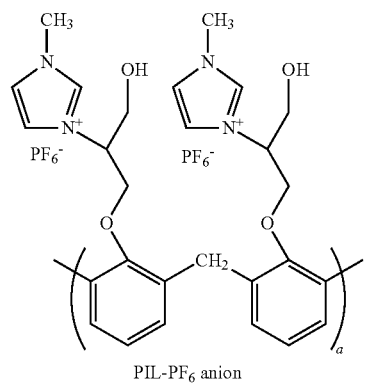

PIL-PF$_6$ anion

EXAMPLE 2 (EX 2)

The PIL-Br anion obtained in Example 1 was dissolved in deionized water at room temperature to obtain a PIL solution. Bis(trifluoromethane) sulfonimide lithium salt (Solvay) was dissolved in deionized water at room temperature to obtain a LiTFSI solution. The LiTFSI solution was added dropwise to the PIL solution and mixed therewith for 6 hours to obtain a precipitate. The precipitate was washed using water to remove unreacted reactants, was dried using a rotary evaporator, and then further dried in a vacuum oven so as to obtain a polymeric ionic liquid with counter-ions of TFSI anions (PIL-TFSI anion).

The scheme for synthesizing the polymer ionic liquid of Example 2 is shown below.

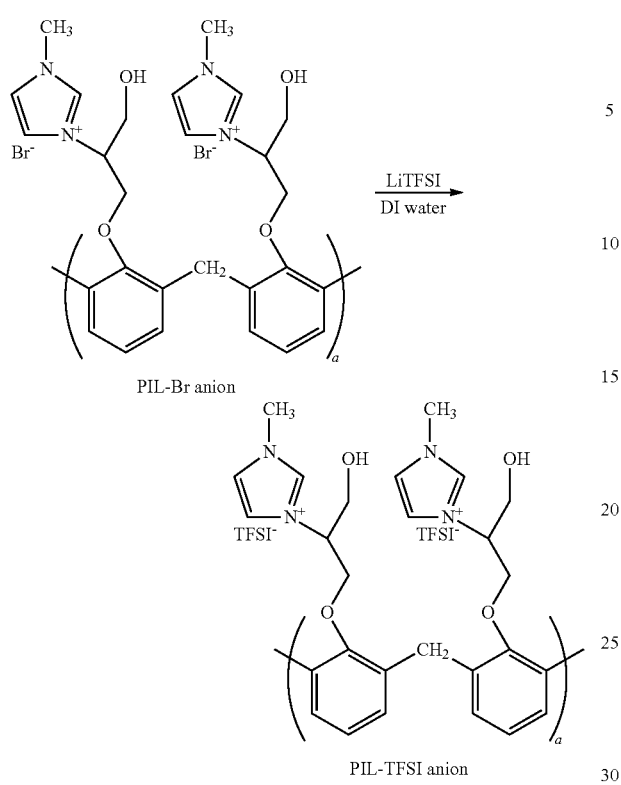

PIL-Br anion

PIL-TFSI anion

EXAMPLE 3 (EX 3)

In a pear-shaped flask, the purified phenolic epoxy resin (6 g) obtained in Example 1 was dissolved in acetonitrile, and then mixed with 8 ml of 1-methylimidazole (Alfa Aesar, 99.0%) at room temperature to allow a ring-opening reaction of the purified phenolic epoxy resin to proceed, with stirring for 24 hours, to thereby obtain an intermediate polymer.

The intermediate polymer was dissolved in deionized water at room temperature to obtain an intermediate solution. Potassium hexafluorophosphate ($KPF_6$) was dissolved in deionized water at room temperature to obtain a $KPF_6$ solution. The $KPF_6$ solution was added dropwise to the intermediate solution and mixed therewith for 6 hours to obtain a precipitate. The precipitate was washed using water to remove unreacted reactants, was dried using a rotary evaporator, and then further dried in a vacuum oven so as to obtain a polymeric ionic liquid with counter-ions of hexafluorophosphate anions ($PIL-PF_6$ anion).

The scheme for synthesizing the polymer ionic liquid of Example 3 is shown below.

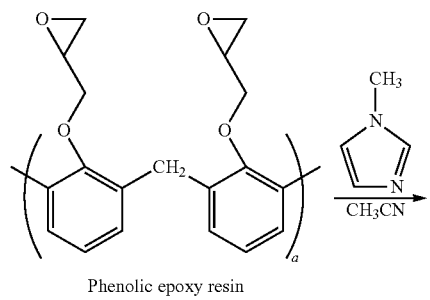

Phenolic epoxy resin

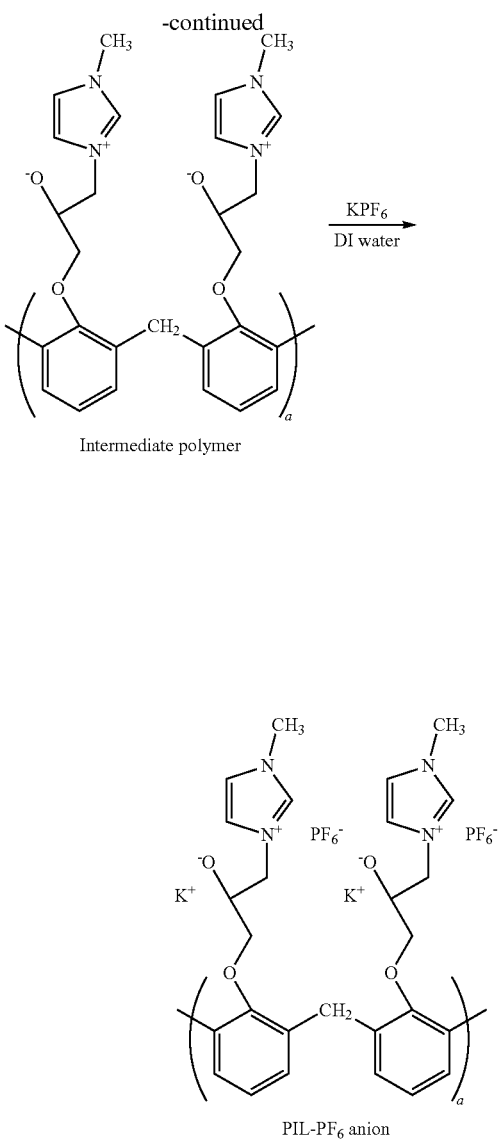

Intermediate polymer $PIL-PF_6$ anion

EXAMPLE 4 (EX 4)

The intermediate polymer obtained in Example 3 was dissolved in deionized water at room temperature to obtain an intermediate solution. Bis(trifluoromethane)sulfonimide lithium salt (Solvay) was dissolved in deionized water at room temperature to obtain a LiTFSI solution. The LiTFSI solution was added dropwise to the intermediate solution and mixed therewith for 6 hours to obtain a precipitate. The precipitate was washed using water to remove unreacted reactants, dried using a rotary evaporator, and then further dried in a vacuum oven so as to obtain a polymeric ionic liquid with counter-ions of TFSI anions (PIL-TFSI anion).

The scheme for synthesizing the polymer ionic liquid of Example 4 is shown below.

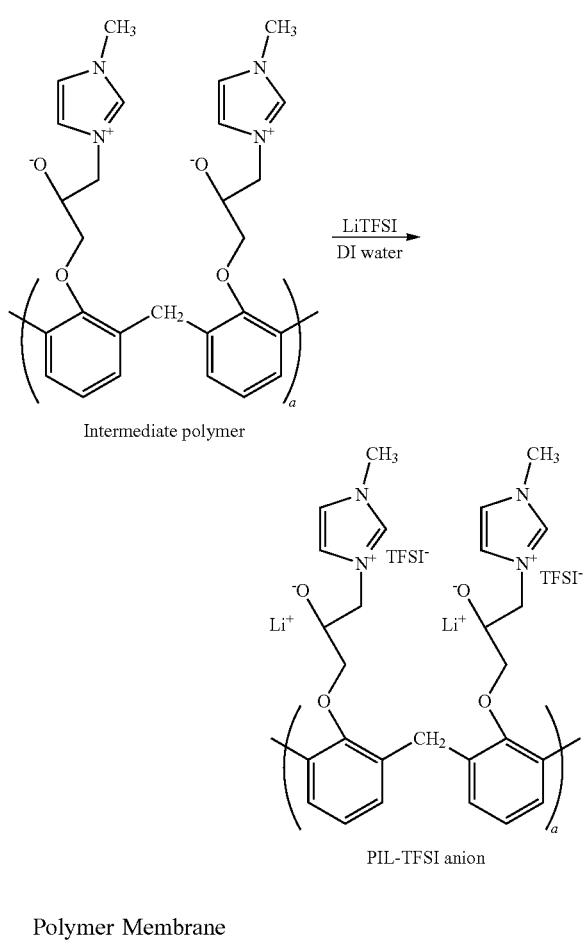

Polymer Membrane

EXAMPLE 5 (EX 5)

The polymeric ionic liquid (PIL-PF$_6$ anion) obtained in Example 1 was dissolved in N-methyl-2-pyrrolidone (solvent) and stirred for 2 hours, poured onto a film forming plate, and then disposed in an oven set at 80° C. for 24 hours to remove the solvent therefrom, thereby obtaining a polymer membrane.

EXAMPLE 6 (EX 6)

A polymer membrane of Example 6 was prepared according to a procedure similar to that described in Example 5, except that the polymeric ionic liquid (PIL-TFSI anion) obtained in Example 2 was used to replace the polymeric ionic liquid (PIL-PF$_6$ anion) of Example 1.

COMPARATIVE EXAMPLE 1 (CE 1)

A polymer membrane of Comparative Example 1 was prepared according to a procedure similar to that described in Example 5, except that the PVdF-co-HFP (poly(vinylidenefluoride-co-hexafluoropropylene)) was used to replace the polymeric ionic liquid (PIL-PF$_6$ anion) of Example 1.

EXAMPLE 7 (EX 7)

The polymeric ionic liquid (PIL-PF$_6$ anion) obtained in Example 1 and PVdF-co-HFP (poly(vinylidenefluoride-co-hexafluoropropylene)) were mixed and dissolved in N-methyl-2-pyrrolidone (solvent) to obtain a mixture in which a weight ratio of PIL-PF$_6$ anion to PVdF-co-HFP was 3:7. The mixture was stirred for 2 hours, poured onto a film forming plate, and then disposed in an oven set at 80° C. for 24 hours to remove the solvent therefrom, thereby obtaining a polymer membrane.

EXAMPLE 8 (EX 8)

A polymer membrane of Example 8 was prepared according to a procedure similar to that described in Example 7, except that a weight ratio of PIL-PF$_6$ anion to PVdF-co-HFP was 1:1.

EXAMPLE 9 (EX 9)

A polymer membrane of Example 9 was prepared according to a procedure similar to that described in Example 7, except that a weight ratio of PIL-PF$_6$ anion to PVdF-co-HFP was 7:3.

EXAMPLE 10 (EX 10)

A polymer membrane of Example 10 was prepared according to a procedure similar to that described in Example 7, except that the polymeric ionic liquid (PIL-TFSI anion) obtained in Example 2 was used to replace the polymeric ionic liquid (PIL-PF$_6$ anion) of Example 1.

EXAMPLE 11 (EX 11)

A polymer membrane of Example 11 was prepared according to a procedure similar to that described in Example 10, except that a weight ratio of PIL-TFSI anion to PVdF-co-HFP was 1:1.

EXAMPLE 12 (EX 12)

A polymer membrane of Example 12 was prepared according to a procedure similar to that described in Example 10, except that a weight ratio of PIL-TFSI anion to PVdF-co-HFP was 7:3.

EXAMPLE 13 (EX 13)

0.197 g of the purified phenolic epoxy resin obtained in Example 1 and 0.553 g of polyetheramine (Jeffamine® ED-2003) were mixed and stirred in acetone (solvent) at 80° C. for 2 hours, poured onto a film forming plate made of polypropylene, and then disposed in an oven set at 80° C. for 24 hours so as to permit a crosslinking reaction to occur and to permit removal of the solvent therefrom, thereby obtaining a polymer membrane.

EXAMPLE 14 (EX 14)

0.1773 g of the purified phenolic epoxy resin obtained in Example 1, 0.498 g of polyetheramine (Jeffamine® ED-2003), and 0.075 g of the polymeric ionic liquid (PIL-PF$_6$ anion) obtained in Example 1 were stirred in acetone (solvent) at 80° C. for 2 hours, poured onto a film forming plate made of polypropylene, and then disposed in an oven set at 80° C. for 24 hours so as to permit a crosslinking reaction to occur and to permit removal of the solvent therefrom, thereby obtaining a polymer membrane.

EXAMPLE 15 (EX 15)

0.1379 g of the purified phenolic epoxy resin obtained in Example 1, 0.3873 g of polyetheramine (Jeffamine® ED-2003), and 0.2251 g of the polymeric ionic liquid (PIL-PF$_6$ anion) obtained in Example 1 were mixed and stirred in acetone (solvent) at 80° C. for 2 hours, poured onto a film forming plate made of polypropylene, and then disposed in an oven set at 80° C. for 24 hours so as to permit a crosslinking reaction to occur and to permit removal of the solvent therefrom, thereby obtaining a polymer membrane. A molar ratio of epoxy group to —CH$_2$CH$_2$O— chain (EO) in the mixture of this example was the same as that of Example 14.

EXAMPLE 16 (EX 16)

0.0985 g of the purified phenolic epoxy resin obtained in Example 1, 0.2767 g of polyetheramine (Jeffamine® ED-2003), and 0.3752 g of the polymeric ionic liquid (PIL-PF$_6$ anion) obtained in Example 1 were mixed and stirred in acetone (solvent) at 80° C. for 2 hours, poured onto a film forming plate made of polypropylene, and then disposed in an oven set at 80° C. for 24 hours so as to permit a crosslinking reaction to occur and to permit removal of the solvent therefrom, thereby obtaining a polymer membrane. A molar ratio of epoxy group to —CH$_2$CH$_2$O— chain (EO) in the mixture of this example was the same as that of Example 14.

EXAMPLE 17 (EX 17)

0.0591 g of the purified phenolic epoxy resin obtained in Example 1, 0.166 g of polyetheramine (Jeffamine® ED-2003), and 0.5253 g of the polymeric ionic liquid (PIL-PF$_6$ anion) obtained in Example 1 were mixed and stirred in acetone at 80° C. for 2 hours, poured onto a film forming plate made of polypropylene, and then disposed in an oven set at 80° C. for 24 hours so as to permit a crosslinking reaction to occur and to permit removal of the solvent therefrom, thereby obtaining a polymer membrane. A molar ratio of epoxy group to —CH$_2$CH$_2$O— chain (EO) in the mixture of this example was the same as that of Example 14.

Coin Cell Type Battery for Electrochemical Stability Test

EXAMPLE 18 (EX 18)

A circular piece (diameter Φ=15 mm) was cut from the polymer membrane obtained in Example 5, and soaked in a LiPF$_6$ electrolyte solution (Ubiq Technology Co., Ltd.) for 24 hours in an argon-filled glovebox to obtain a gel polymer electrolyte. The LiPF$_6$ electrolyte solution had a LiPF$_6$ concentration of 1.0M in ethylene carbonate (EC)/dimethyl carbonate (DMC)/diethyl carbonate (DEC) (1:1:1 in V/V). A coin cell type battery was assembled in a dry, oxygen free glovebox. In the coin cell type battery, the gel polymer electrolyte served as a separator, a lithium foil served as a counter and reference electrode, and a stainless steel disc served as a working electrode.

EXAMPLE 19 (EX 19)

A coin cell type battery of Example 19 was prepared according to a procedure similar to that described in Example 18, except that the polymer membrane obtained in Example 6 was used to replace the polymer membrane of Example 5.

EXAMPLE 20 (EX 20)

A coin cell type battery of Example 20 was prepared according to a procedure similar to that described in Example 18, except that the polymer membrane obtained in Example 10 was used to replace the polymer membrane of Example 5.

EXAMPLE 21 (EX 21)

A coin cell type battery of Example 21 was prepared according to a procedure similar to that described in Example 18, except that the polymer membrane obtained in Example 11 was used to replace the polymer membrane of Example 5.

EXAMPLE 22 (EX 22)

A coin cell type battery of Example 22 was prepared according to a procedure similar to that described in Example 18, except that the polymer membrane obtained in Example 12 was used to replace the polymer membrane of Example 5.

Coin Cell Type Battery for Ionic Conductivity Test

EXAMPLE 23 (EX 23)

A circular piece (diameter Φ=15 mm) was cut from the polymer membrane obtained in Example 7, and soaked in the above-mentioned LiPF$_6$ electrolyte solution for 24 hours in an argon-filled glovebox to obtain a gel polymer electrolyte. A coin cell type battery having the gel polymer electrolyte sandwiched between two parallel stainless steel discs was assembled in the glovebox.

EXAMPLE 24 (EX 24)

A coin cell type battery of Example 24 was prepared according to a procedure similar to that described in Example 23, except that the polymer membrane obtained in Example 8 was used to replace the polymer membrane of Example 7.

EXAMPLE 25 (EX 25)

A coin cell type battery of Example 25 was prepared according to a procedure similar to that described in Example 23, except that the polymer membrane obtained in Example 9 was used to replace the polymer membrane of Example 7.

EXAMPLE 26 (EX 26)

A coin cell type battery of Example 26 was prepared according to a procedure similar to that described in Example 23, except that the polymer membrane obtained in Example 10 was used to replace the polymer membrane of Example 7.

EXAMPLE 27 (EX 27)

A coin cell type battery of Example 27 was prepared according to a procedure similar to that described in Example 23, except that the polymer membrane obtained in Example 11 was used to replace the polymer membrane of Example 7.

EXAMPLE 28 (EX 28)

A coin cell type battery of Example 28 was prepared according to a procedure similar to that described in Example 23, except that the polymer membrane obtained in Example 12 was used to replace the polymer membrane of Example 7.

COMPARATIVE EXAMPLE 2 (CE 2)

A coin cell type battery of Comparative Example 2 was prepared according to a procedure similar to that described in Example 23, except that the polymer membrane obtained in Comparative Example 1 was used to replace the polymer membrane of Example 7.

Coin Cell Type Battery for Battery Capacity Test

EXAMPLE 29 (EX 29)

A circular piece (diameter Φ=15 mm) was cut from the polymer membrane obtained in Example 9, and soaked in the above-mentioned $LiPF_6$ electrolyte solution for 24 hours in an argon-filled glovebox to obtain a gel polymer electrolyte.

A slurry mixture was prepared by adding 80 wt % $LiFePO_4$ powder (Aleees Advanced Lithium Electrochemistry Co. Ltd., Taiwan), 10 wt % conductive carbon black (Super P from Timcal), and 10 wt % polyvinylidene fluoride (PVDF) to N-methyl-2-pyrrolidone (NMP), followed by stirring for 24 hours. The $LiFePO_4$ powder and the conductive carbon black were ground in advance. A cathode was prepared by coating the slurry mixture evenly onto a high purity aluminum foil, drying at 90° C. for 24 hours in vacuum to obtain a cathode film, pressing the cathode film evenly using a rolling machine, and then cutting the cathode film into a cathode disc. A high purity lithium metal served as an anode.

A coin cell type battery having the gel polymer electrolyte sandwiched between the cathode and the anode was assembled in the glovebox.

EXAMPLE 30 (EX 30)

A coin cell type battery of Example 30 was prepared according to a procedure similar to that described in Example 29, except that the polymer membrane obtained in Example 10 was used to replace the polymer membrane of Example 9.

EXAMPLE 31 (EX 31)

A coin cell type battery of Example 31 was prepared according to a procedure similar to that described in Example 29, except that the polymer membrane obtained in Example 11 was used to replace the polymer membrane of Example 9.

EXAMPLE 32 (EX 32)

A coin cell type battery of Example 32 was prepared according to a procedure similar to that described in Example 29, except that the polymer membrane obtained in Example 12 was used to replace the polymer membrane of Example 9.

COMPARATIVE EXAMPLE 3 (CE 3)

A coin cell type battery of Comparative Example 3 was prepared according to a procedure similar to that described in Example 29, except that the polymer membrane obtained in Comparative Example 1 was used to replace the polymer membrane of Example 9.

EXAMPLE 33 (EX 33)

A coin cell type battery of Example 33 was prepared according to a procedure similar to that described in Example 29, except that the polymer membrane obtained in Example 13 was used to replace the polymer membrane of Example 9.

EXAMPLE 34 (EX 34)

A coin cell type battery of Example 34 was prepared according to a procedure similar to that described in Example 29, except that the polymer membrane obtained in Example 14 was used to replace the polymer membrane of Example 9.

EXAMPLE 35 (EX 35)

A coin cell type battery of Example 35 was prepared according to a procedure similar to that described in Example 29, except that the polymer membrane obtained in Example 15 was used to replace the polymer membrane of Example 9.

EXAMPLE 36 (EX 36)

A coin cell type battery of Example 36 was prepared according to a procedure similar to that described in Example 29, except that the polymer membrane obtained in Example 16 was used to replace the polymer membrane of Example 9.

EXAMPLE 37 (EX 37)

A coin cell type battery of Example 37 was prepared according to a procedure similar to that described in Example 29, except that the polymer membrane obtained in Example 17 was used to replace the polymer membrane of Example 9.

Coin Cell Type Battery for Positive Electrode Test

EXAMPLE 38 (EX 38)

A slurry mixture was prepared by adding 80 wt % $LiFePO_4$ powder (Aleees Advanced Lithium Electrochemistry Co. Ltd., Taiwan), 10 wt % conductive carbon black (Super P from Timcal), and 10 wt % binder to N-methyl-2-pyrrolidone (NMP), followed by stirring for 24 hours. The binder included the polymeric ionic liquid (the PIL-TFSI anion obtained in Example 2) and polyvinylidene fluoride (PVDF), in which a weight ratio of the PIL-TFSI anion to PVDF was 3:7.

A positive electrode was prepared by coating the slurry mixture evenly onto a high purity aluminum foil, drying at 100° C. for 24 hours in vacuum to obtain an electrode film, pressing the electrode film evenly using a rolling machine, and then cutting the electrode film into a positive electrode disc (diameter Φ=13 mm). A high purity lithium metal served as a negative electrode.

A commercial separator (Celgard M824) was soaked in the above-mentioned $LiPF_6$ electrolyte solution for 24 hours in an argon-filled glovebox to obtain a polymer electrolyte.

A coin cell type battery having the polymer electrolyte sandwiched between the positive and negative electrodes was assembled in the glovebox.

EXAMPLE 39 (EX 39)

A coin cell type battery of Example 39 was prepared according to a procedure similar to that described in Example 38, except that in the binder, a weight ratio of the PIL-TFSI anion to PVDF was 1:1.

COMPARATIVE EXAMPLE 4 (CE 4)

A coin cell type battery of Comparative Example 4 was prepared according to a procedure similar to that described in Example 38, except that the binder included only the PVDF.

Coin Cell Type Battery Having an Electrospun Polymer Membrane

EXAMPLE 40 (EX 40)

The polymeric ionic liquid (PIL-TFSI anion) obtained in Example 2 and PVdF-co-HFP were dissolved in dimethylformamide (DMF) to obtain a homogeneous solution (10 wt %), in which a weight ratio of PIL-TFSI anion to PVdF-co-HFP was 1:1. The homogeneous solution was subjected to electrospinning at 20 kV using an electrospinning device. The homogeneous solution was accelerated to flow out from a nozzle tip of the electrospinning device toward a collector at a flow rate of 0.25 ml/hr to obtain polymer nanofibers. A distance from the nozzle tip to the collector was set to be 20 cm. After a period of electrospinning time, an electrospun polymer membrane having a thickness of 20 μm was obtained. The electrospun polymer membrane was dried overnight at 60° C. to remove residual DMF.

A coin cell type battery was prepared according to a procedure similar to that described in Example 18, except that the electrospun polymer membrane was used to replace the polymer membrane obtained in Example 5.

<Evaluation>
$^1$H-NMR Analysis

A test sample was placed in an oven (80° C.) for 12 hours and then placed in a quartz tube. Deuterated acetone was used as a solvent for the test sample. $^1$H-NMR spectra were recorded in a Bruker AV-600 spectrometer. The $^1$H-NMR spectrum for the purified phenolic epoxy resin and the brominated intermediate polymer obtained in Example 1 is shown in FIG. 1. The $^1$H-NMR spectrum for the PIL-TFSI anion obtained in Example 2 is shown in FIG. 2.

It can be noted from FIG. 1 that the purified phenolic epoxy resin had chemical shifts (δ=2.5~2.8 ppm, and δ=3.1~3.3 ppm) due to hydrogen atoms in the epoxy group (near the positions 1, 1', and 2). The brominated intermediate polymer did not have the above chemical shifts. Instead, the brominated intermediate polymer exhibited relatively high chemical shifts (δ=3.4~3.7 ppm, and δ=4.1 ppm) due to a reaction of hydrogen bromine and the epoxy group. There-fore, the reaction between the purified phenolic epoxy resin and the hydrobromic acid was confirmed to be a ring opening reaction.

Figure 2:
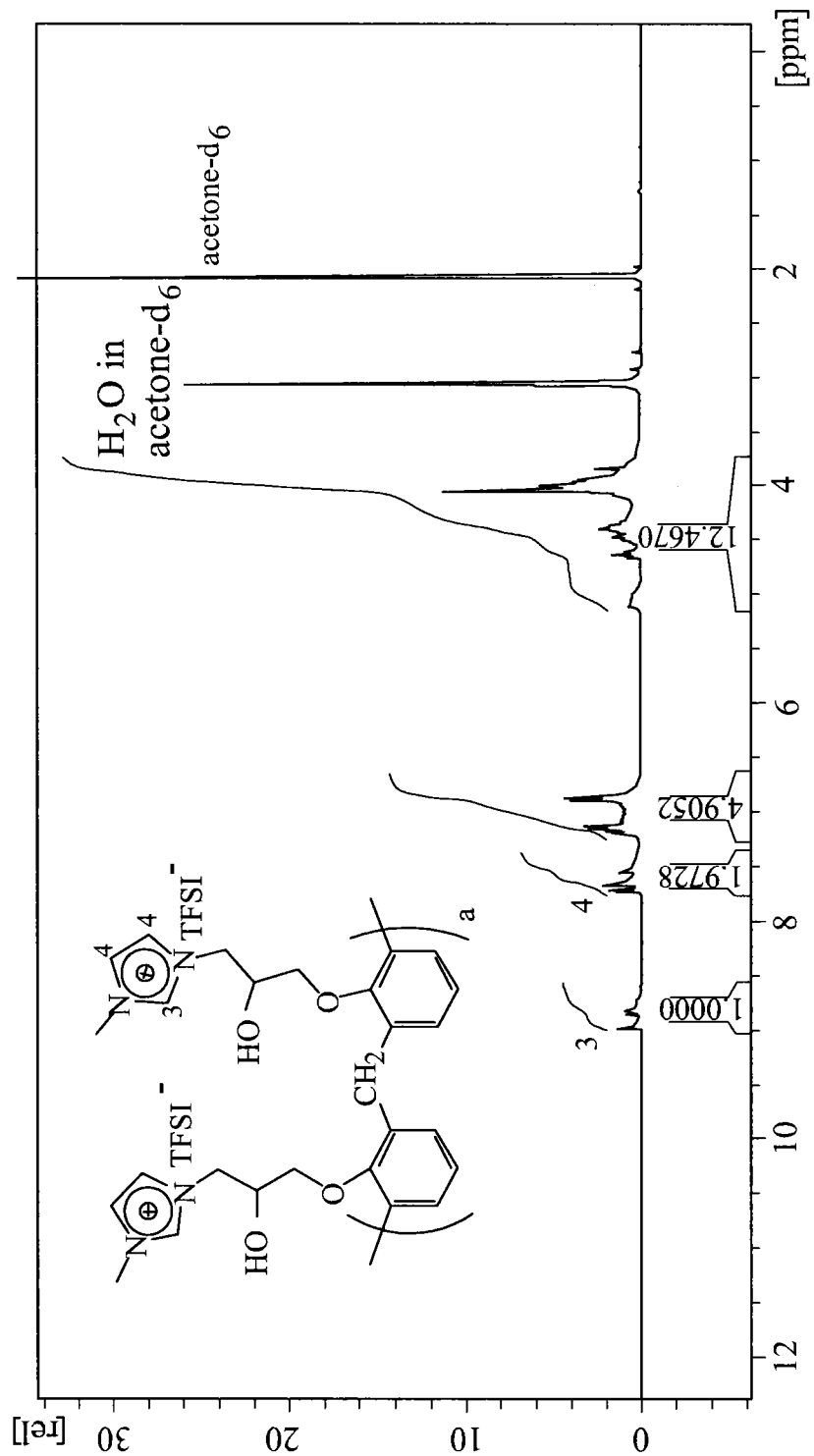
FIG. 2 shows a $^1$H-NMR spectrum for a polymeric ionic liquid (PIL-TFSI anion) obtained in Example 2.

It can be noted from the spectrum of the PIL-TFSI anion shown in FIG. 2 that a ratio of an integrated intensity of the chemical shift (δ=8.6~9.1 ppm) to an integrated intensity of the chemical shift (δ=7.3~7.8 ppm) was 1/2. This confirmed that an anion of 1-methylimidazole did exist in the PIL-TFSI anion of Example 2.

FT-IR Analysis

A test sample and an IR transparent crystal (potassium bromide, KBr) were mixed and ground into fine powders, and then the mixture was pressed into a KBr disk. The KBr disk was placed in an oven (80° C.) for 12 hours. Thereafter, the KBr disk was analyzed by FT-IR (NICOLET 5700) at room temperature in a wavelength range between 4000 $cm^{-1}$ and 400 $cm^{-1}$. The IR spectrum for the PIL-Br anion and the PIL-$PF_6$ anion obtained in Example 1 are shown in FIG. 3(A), and the IR spectrum for the PIL-Br anion obtained in Example 1 and the PIL-TFSI anion obtained in Example 2 are shown in FIG. 3(B).

Figure 3A:
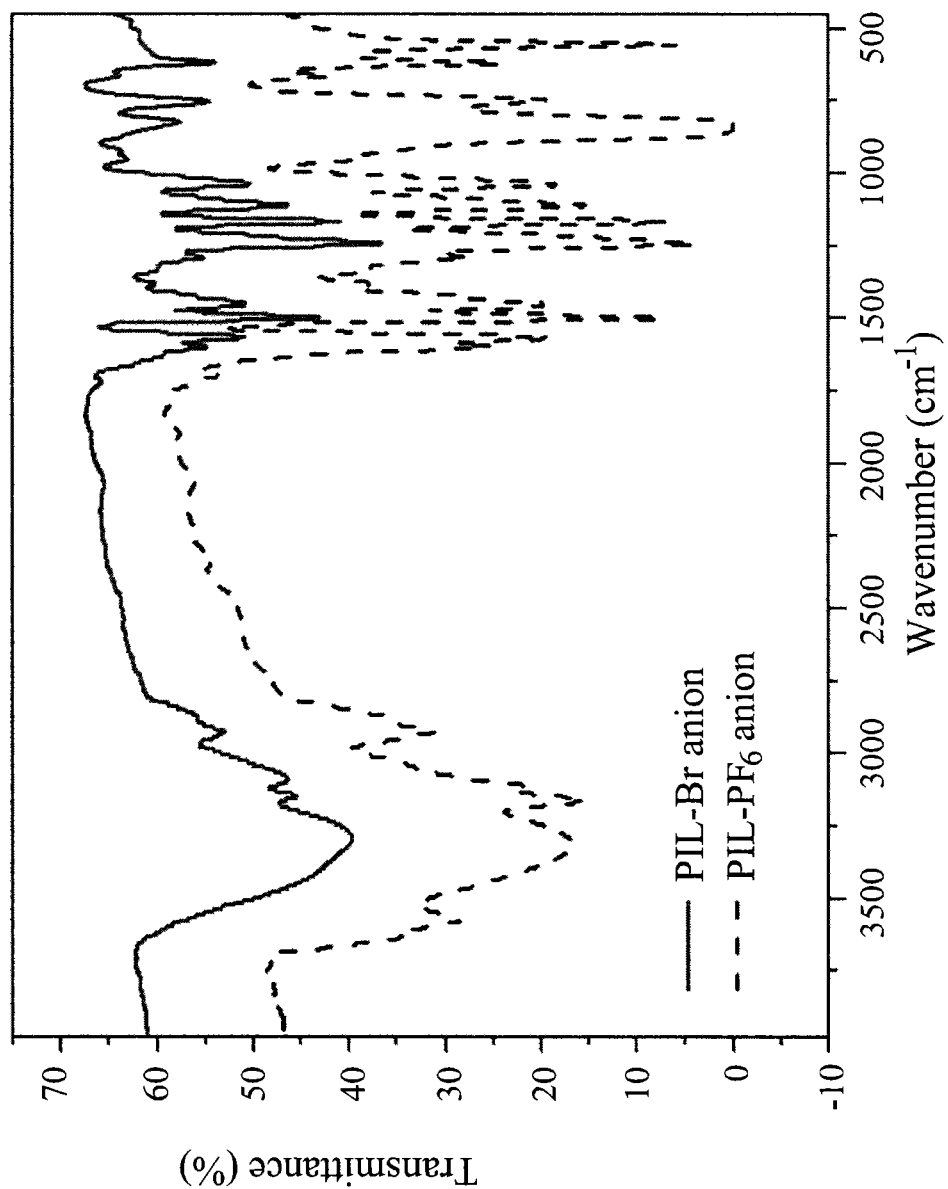
FIG. 3(A) shows an IR spectrum for polymeric ionic liquids (PIL-Br anion and PIL-PF$_6$ anion) obtained in Example 1.

From the IR spectrum shown in FIG. 3(A), the characteristic peaks of the $PF_6$ anion at 563 $cm^{-1}$ and 882 $cm^{-1}$ were found. This confirmed that the PIL-$PF_6$ anion was obtained through an anion replacement reaction.

Figure 3B:
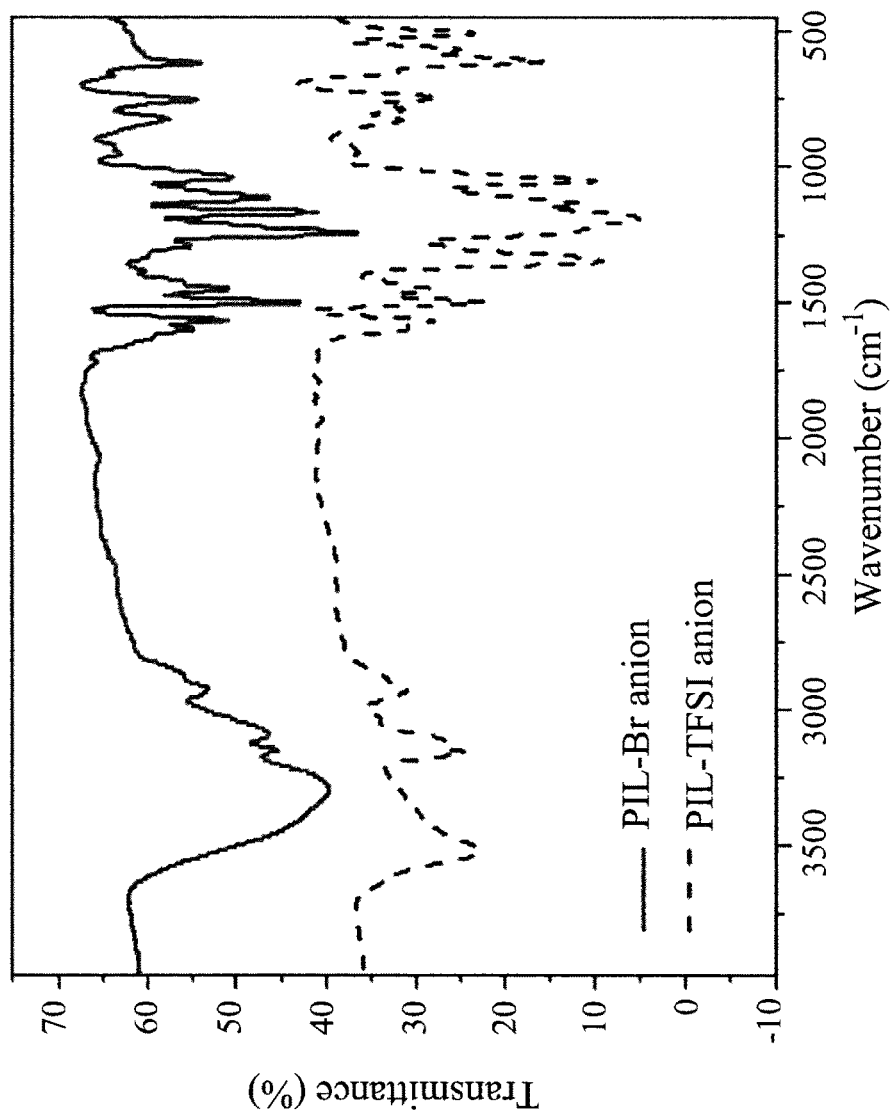
FIG. 3(B) shows an IR spectrum for the polymeric ionic liquid (PIL-Br anion) obtained in Example 1 and a polymeric ionic liquid (PIL-TFSI anion) obtained in Example 2.

From the IR spectrum shown in FIG. 3(B), the characteristic peaks of TFSI anion listed in Table 1 were found. This confirmed that the PIL-TFSI anion was obtained through an anion replacement reaction.

TABLE 1

| Frequency ($cm^{-1}$) | Vibration Mode |
|---|---|
| 1349 | $SO_2$ asymmetric |
| 1193 | $CF_3$ symmetric |
| 1136 | $SO_2$ symmetric |
| 1054 | SNS asymmetric |

Heat Stability Test

Figure 4:
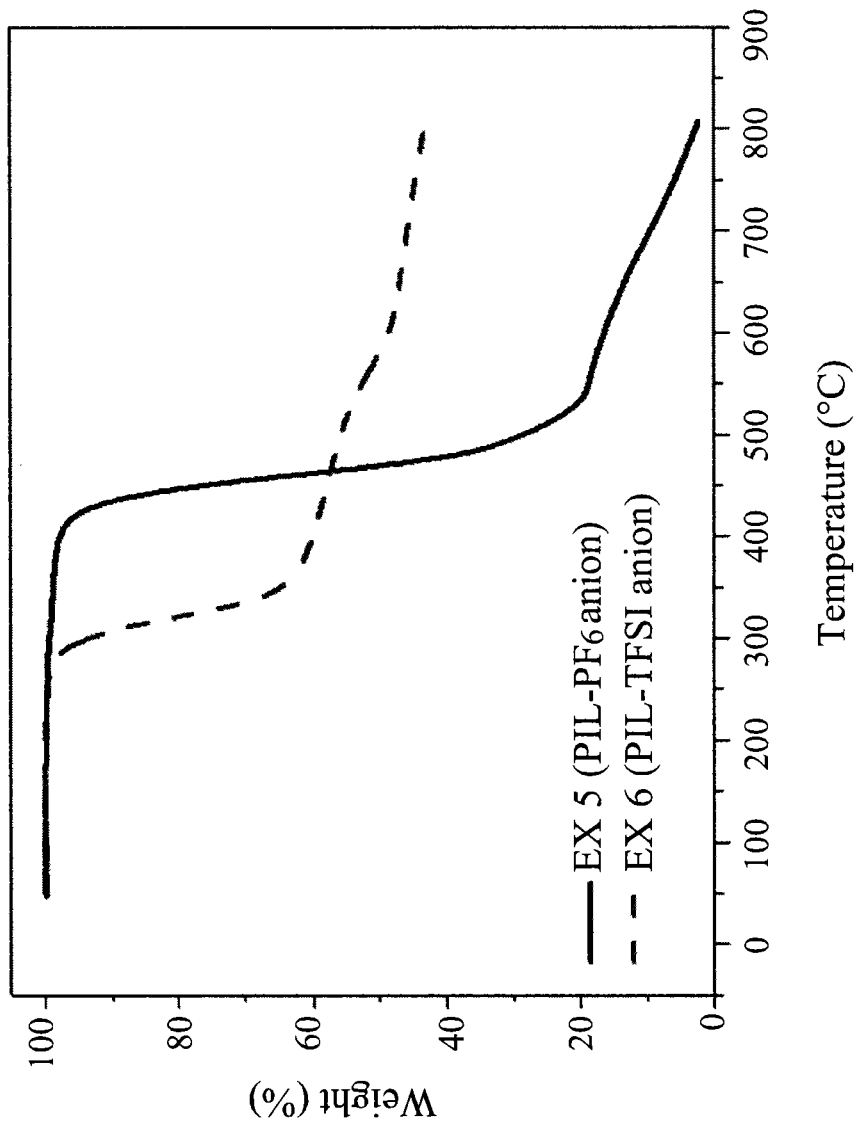
FIG. 4 shows TGA profiles for polymer membranes of Examples 5 and 6.
Figure 5:
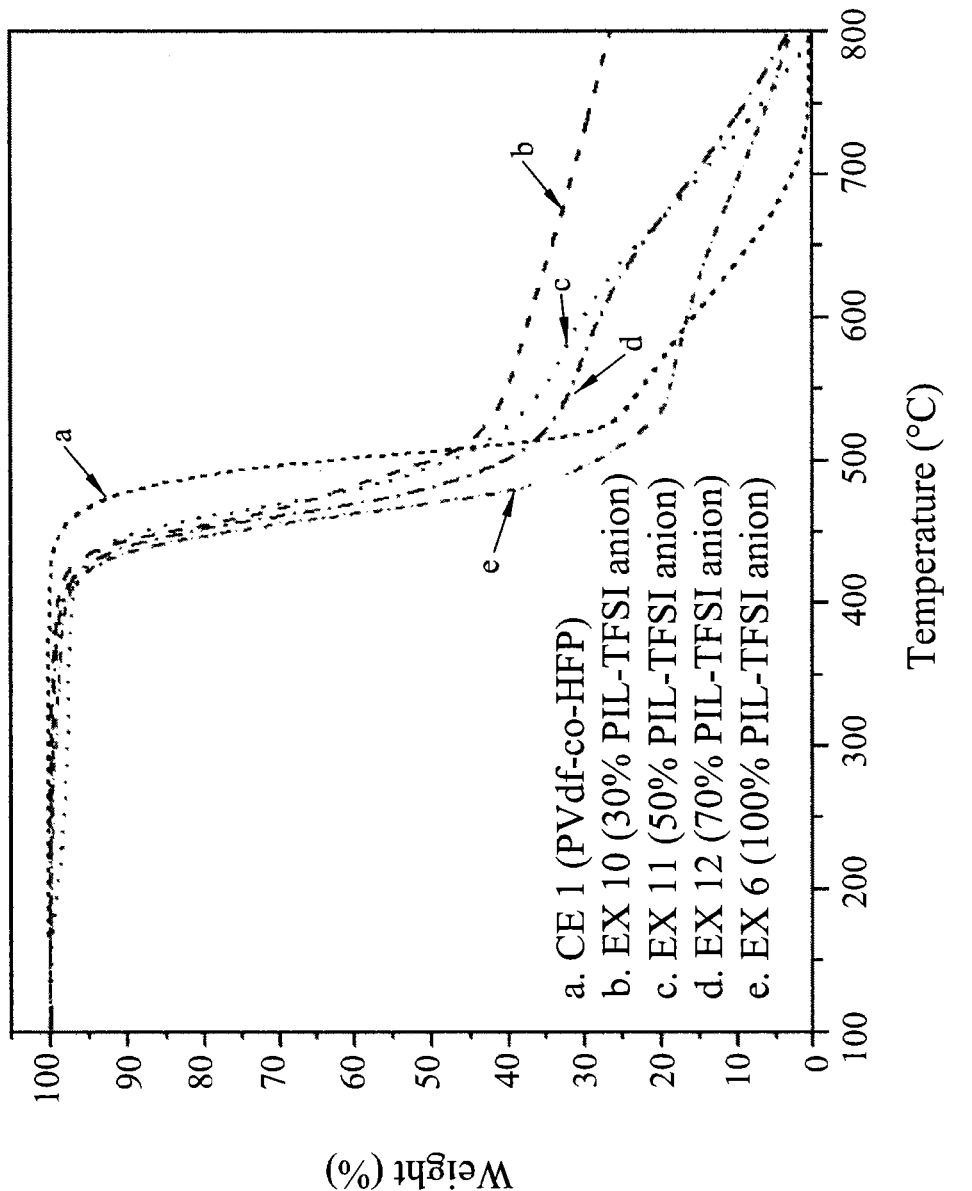
FIG. 5 shows TGA profiles for polymer membranes of Examples 6 and 10~12 and Comparative Example 1.

A polymer membrane (3~5 mg) was analyzed using a thermogravimetric analyzer (Perkin Elmer TGA 7) under a nitrogen atmosphere. The polymer membrane in the thermogravimetric analyzer was heated at a heating rate of 20° C./min to 120° C. to remove moisture therefrom. After the temperature of the polymer membrane was down to 50° C., the polymer membrane was further heated in the thermogravimetric analyzer at a heating rate of 20° C./min to 800° C. for the heat stability test. The TGA test results for the polymer membranes of Examples 5 and 6 are shown in FIG. 4. The TGA test results for the polymer membranes of Examples 6 and 10~12 and Comparative Example 1 are shown in FIG. 5. The temperature when the polymer membrane had a weight loss of 5% was defined as a degradation temperature (Td). The degradation temperatures for the polymer membranes of Examples 5, 6, and 10~12 and Comparative Example 1 are shown in Table 2.

TABLE 2

| Sample | Degradation Temperature (° C.) |
|---|---|
| CE 1 | 466.6 |
| EX 5 | 296.0 |
| EX 6 | 422.5 |
| EX 10 | 433.5 |
| EX 11 | 429.0 |
| EX 12 | 426.6 |

As shown in Table 2, the degradation temperatures of the polymer membranes of Examples 5, 6, and 10~12 and Comparative Example 1 are all higher than 250° C. Under a working temperature (25° C.~90° C.) of a lithium-ion battery, the polymer membranes of Examples 5, 6, and 10~12 and Comparative Example 1 have good heat stability.

Thermal Transition Property Test

Figure 6:
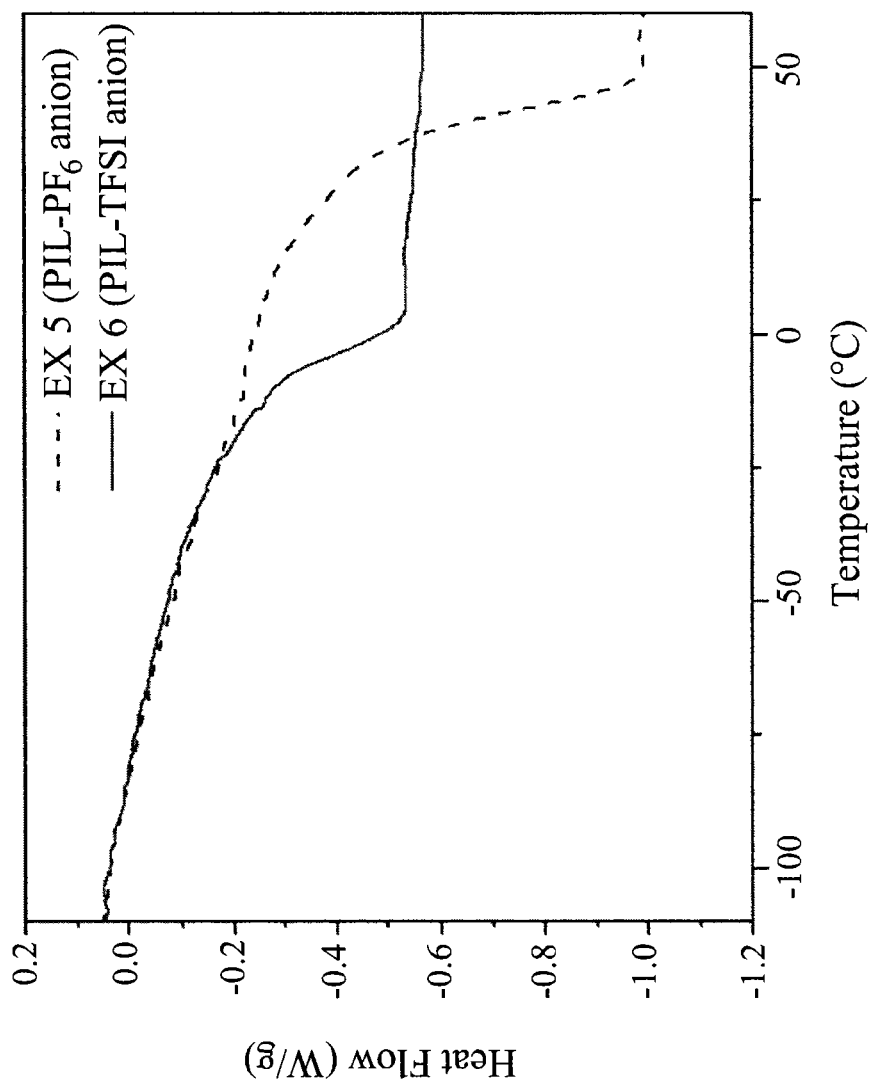
FIG. 6 shows DSC curves for the polymer membranes of Examples 5 and 6.
Figure 7:
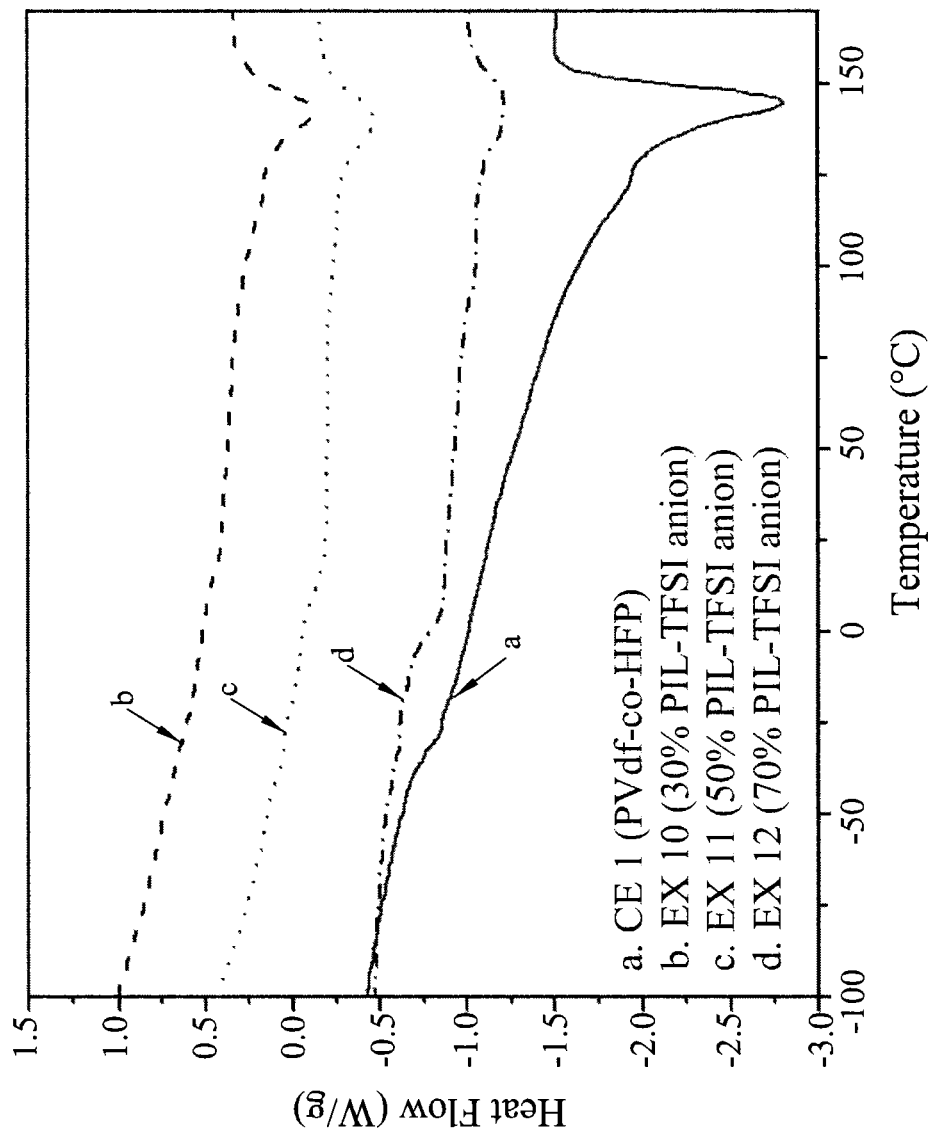
FIG. 7 shows DSC curves for the polymer membranes of Examples 10 to 12 and Comparative Example 1.

A thermal transition property of a dried polymer membrane (3~5 mg) was measured under a nitrogen atmosphere using a TA Instruments DSC 2010 in a temperature range from −150° C. to 150° C. with the temperature rising at a rate of 10° C./min. The nitrogen flow rate was controlled at 55 ml/min. DSC curves for the polymer membranes of Examples 5 and 6 are shown in FIG. 6. DSC curves for the polymer membranes of Examples 10~12 and Comparative Example 1 are shown in FIG. 7.

From the DSC curves, melting enthalpy (ΔH) of PVdF-co-HFP for each polymer membrane were calculated, and glass transition temperature (Tg) and melting temperature (Tm) were observed. The data of ΔH, Tg, and Tm are summarized in Table 3.

TABLE 3

| Sample | Tg (° C.) | Tm (° C.) | ΔH (J/g PVdF-co-HFP) |
|---|---|---|---|
| EX 5 | 50.0 | — | — |
| EX 6 | −4.53 | — | — |
| CE 1 | −30.97 | 143.67 | 27.91 |
| EX 10 | 14.36 | 142.75 | 26.19 |
| EX 11 | 11.85 | 140.85 | 21.46 |
| EX 12 | −0.9 | 143.48 | 14.87 |

From the data of ΔH shown in Table 3, it was noted that the crystallinity of the PVdF-co-HFP deteriorated due to the existence of the polymer ionic liquid.

Electrochemical Stability Test

An electrochemical stability window of a coin cell type battery was determined by linear sweep voltammetry using an electrochemical instrument (CHI604A, CH Instrument, Inc.). The potential was swept from an open circuit voltage to 6 V at a scanning rate of 5 mVs$^{-1}$. The electrochemical stability results (linear sweep voltammetry curves) for the coin cell type batteries of Examples 18 and 19 are shown in FIG. 8, and the electrochemical stability results for the coin cell type batteries of Examples 20 to 22 are shown in FIG. 9.

Figure 8:
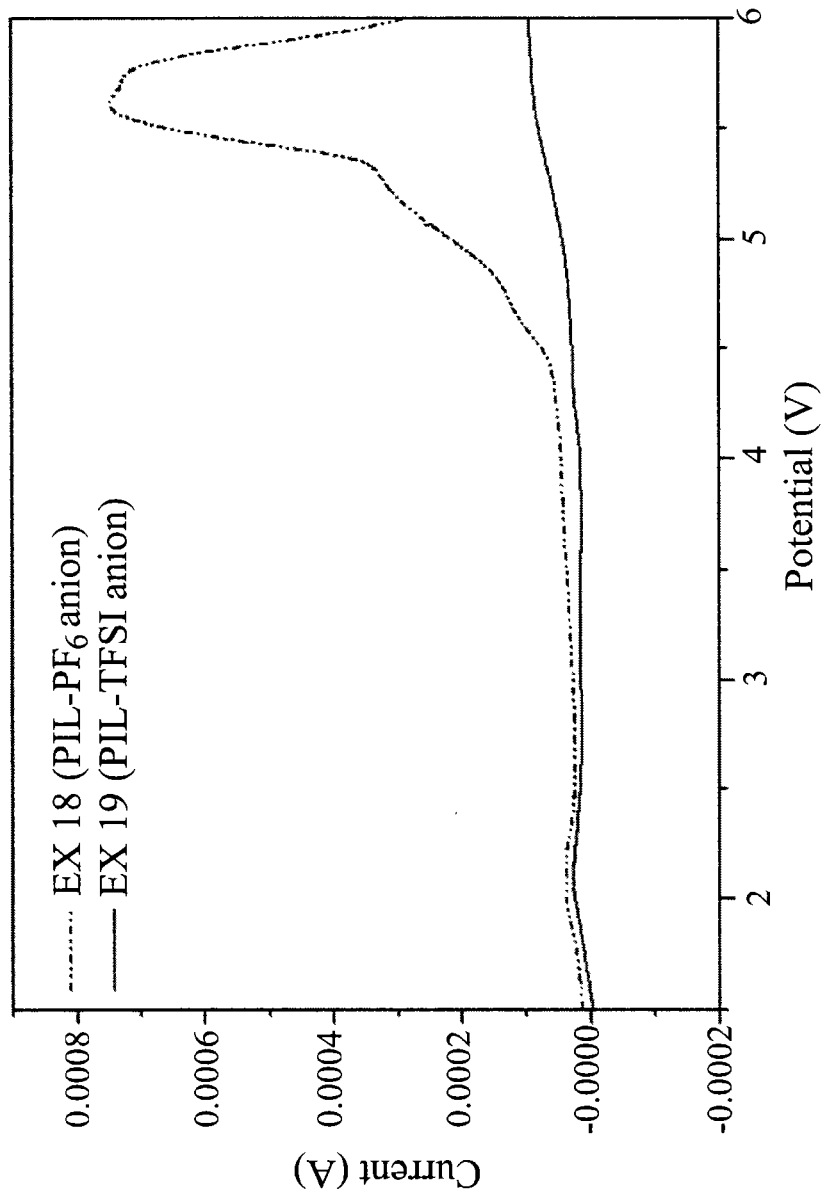
FIG. 8 shows electrochemical windows for coin cell type batteries of Examples 18 and 19.

It can be seen from FIG. 8 that the coin cell type battery of Example 18 (which had the polymeric ionic liquid (PIL-PF$_6$ anion) of Example 1) had an oxidation voltage of about 4.5 V, and that the coin cell type battery of Example 19 (which had the polymeric ionic liquid (PIL-TFSI anion) of Example 2) had an oxidation voltage of about 4.7 V.

Figure 9:
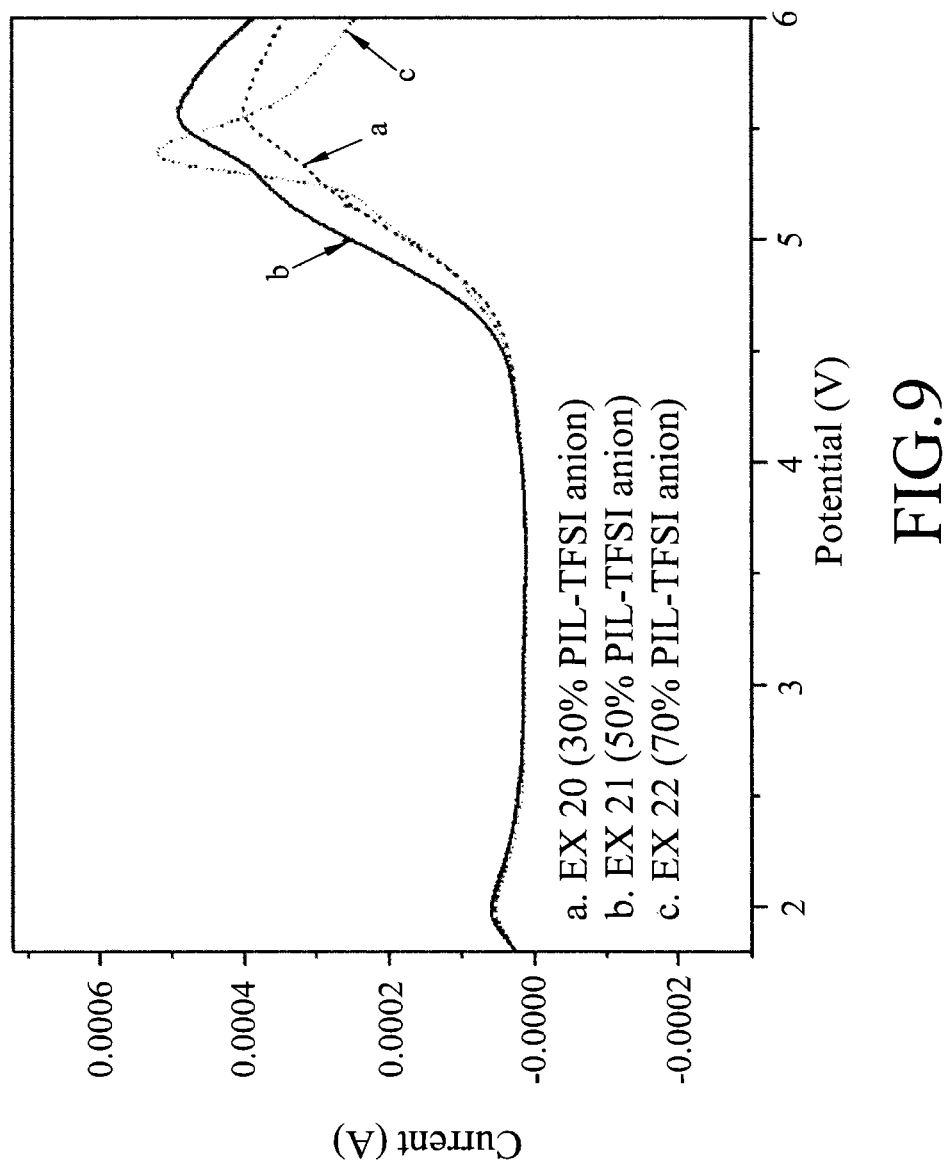
FIG. 9 shows electrochemical windows for coin cell type batteries of Examples 20 to 22.

It can be seen from FIG. 9 that the coin cell type battery of Examples 20 to 22 (which had the polymeric ionic liquid (PIL-TFSI anion) of Example 2 in different weight ratios) had oxidation voltages of about 4.5 V.

From the oxidation voltages of the coin cell type battery of Examples 18~22, it can be anticipated that when the polymer membranes including the polymeric ionic liquids of Example 1 or 2 are applied to the gel polymer electrolytes of lithium-ion batteries, the lithium-ion batteries will have high electrochemical stability under an operating voltage (2.5 V~4.2 V).

Ionic Conductivity Test

Ionic conductivities of a gel polymer electrolyte in a coin cell type battery at different temperatures were determined by electrochemical impedance spectroscopy on an electrochemical instrument (CHI604A, CH Instrument, Inc.) using alternative current signals with a potential amplitude of 10 mV and frequencies from 100 kHz to 10 Hz.

Ionic conductivity (σ)=l/RS where l is the thickness of the gel polymer electrolyte, S is the contact area between the gel polymer electrolyte and the stainless steel discs, and R is the bulk resistance of the gel polymer electrolyte.

Figure 10:
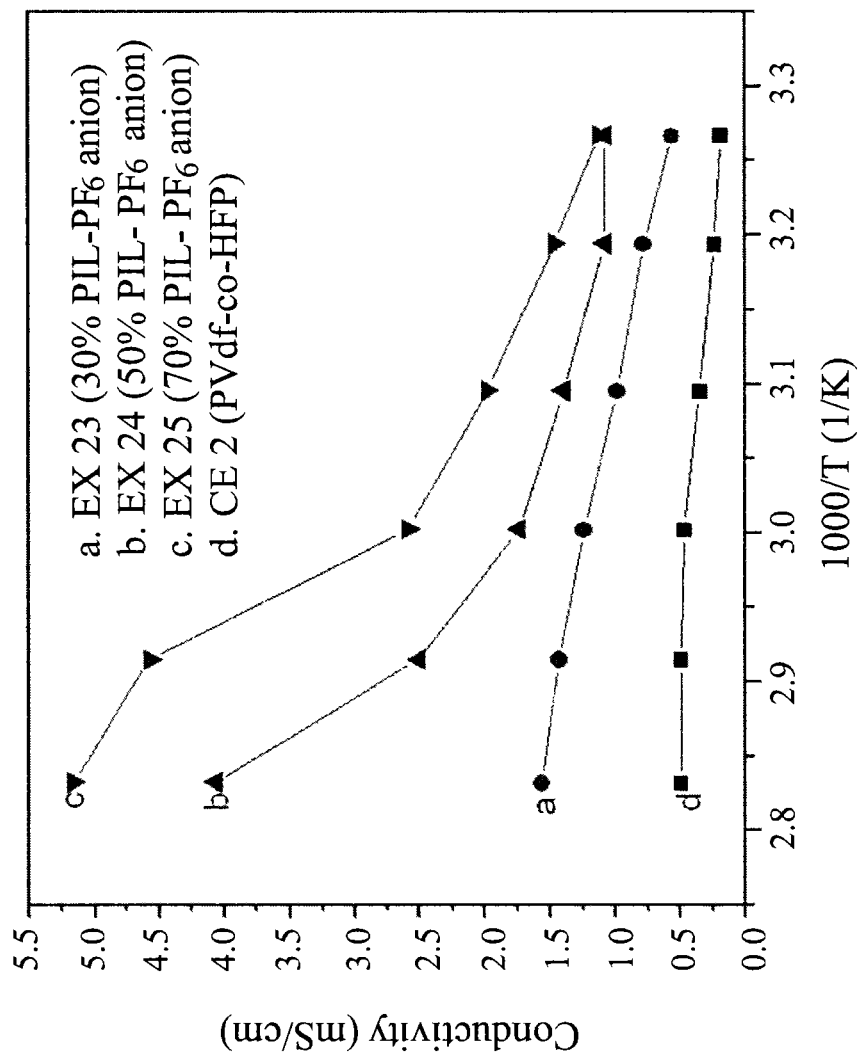
FIG. 10 is a graph plotting ionic conductivity versus temperature of gel polymer electrolytes in coin cell type batteries of Examples 23 to 25 and Comparative Example 2.
Figure 11:
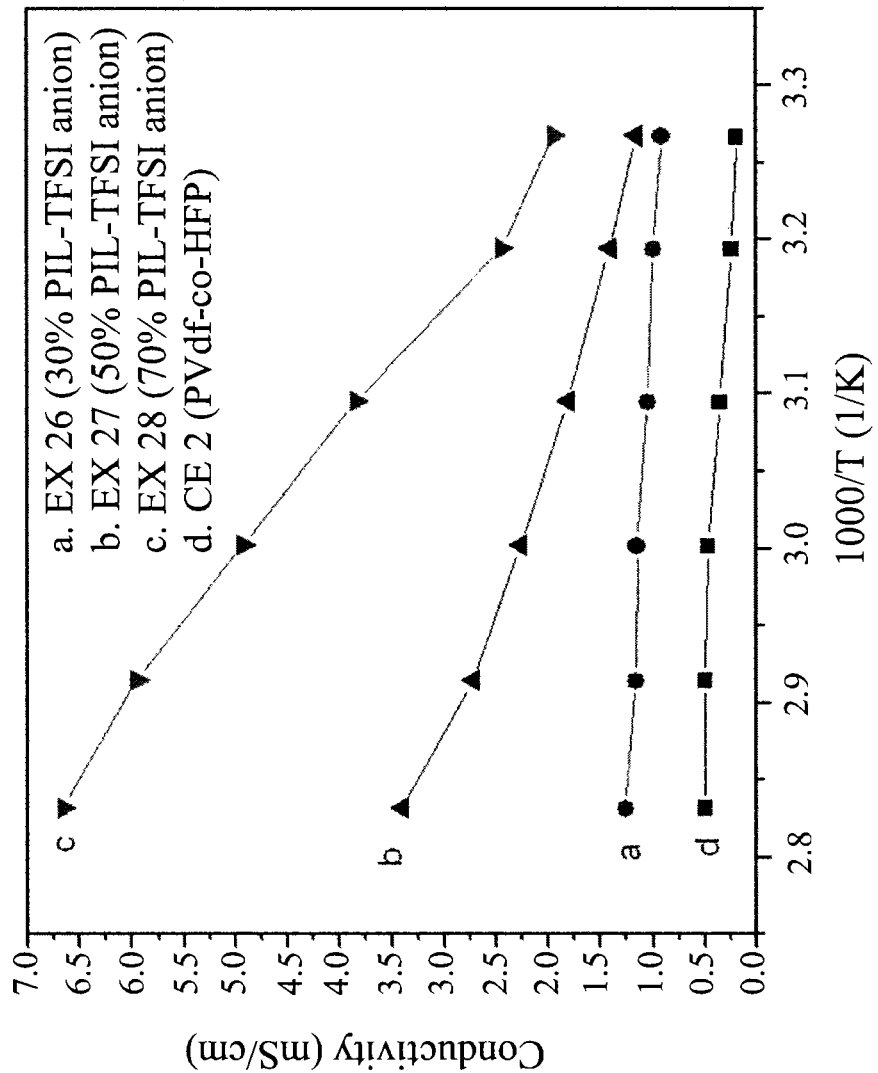
FIG. 11 is a graph plotting ionic conductivity versus temperature of gel polymer electrolytes in coin cell type batteries of Examples 26 to 28 and Comparative Example 2.

The ionic conductivities at different temperatures (30° C.~80° C.) for the gel polymer electrolytes of the coin cell type batteries of Examples 23 to 25 and Comparative Example 2 are shown in FIG. 10. The ionic conductivities at different temperatures (30° C.~80° C.) for the gel polymer electrolytes of the coin cell type batteries of Examples 26 to 28 and Comparative Example 2 are shown in FIG. 11.

The gel polymer electrolyte in Comparative Example 2 had poor ionic conductivities between 30° C. and 80° C.

At 30° C., the ionic conductivities of the gel polymer electrolytes (each including PIL-PF$_6$ anion) in Examples 23 to 25 were 0.57×10$^{-3}$ mScm$^{-1}$, 1.09×10$^{-3}$ mScm$^{-1}$, and 1.13×10$^{-3}$ mScm$^{-1}$, respectively, and the ionic conductivities of the gel polymer electrolytes (each including PIL-TFSI anion) in Examples 26 to 28 were 0.92×10$^{-3}$ mScm$^{-1}$, 1.16×10$^{-3}$ mScm$^{-1}$, and 1.95×10$^{-3}$ mScm$^{-1}$, respectively.

At 80° C., the ionic conductivities of the gel polymer electrolytes (each including PIL-PF$_6$ anion) in Examples 23 to 25 were 1.57×10$^{-3}$ mScm$^{-1}$, 4.07×10$^{-3}$ mScm$^{-1}$, and 5.17×10$^{-3}$ mScm$^{-1}$, respectively, and the ionic conductivities of the gel polymer electrolytes (each including PIL-TFSI anion) in Examples 26 to 28 were 1.26×10$^{-3}$ mScm$^{-1}$, 3.40×10$^{-3}$ mScm$^{-1}$, and 6.66×10$^{-3}$ mScm$^{-1}$, respectively.

It can be concluded that the gel polymer electrolytes in the coin cell type batteries of Examples 23 to 28 had ionic conductivities higher than that of Comparative Example 2.

Battery Capacity Test—1

A coin cell type battery was charged at 0.1 C, followed by discharging at different discharging rates. This test was performed galvanostatically between 2.5 V and 4.0 V at room temperature on a Battery Automation Test system (Acu Tech Systems, BAT-750B).

Figure 12:
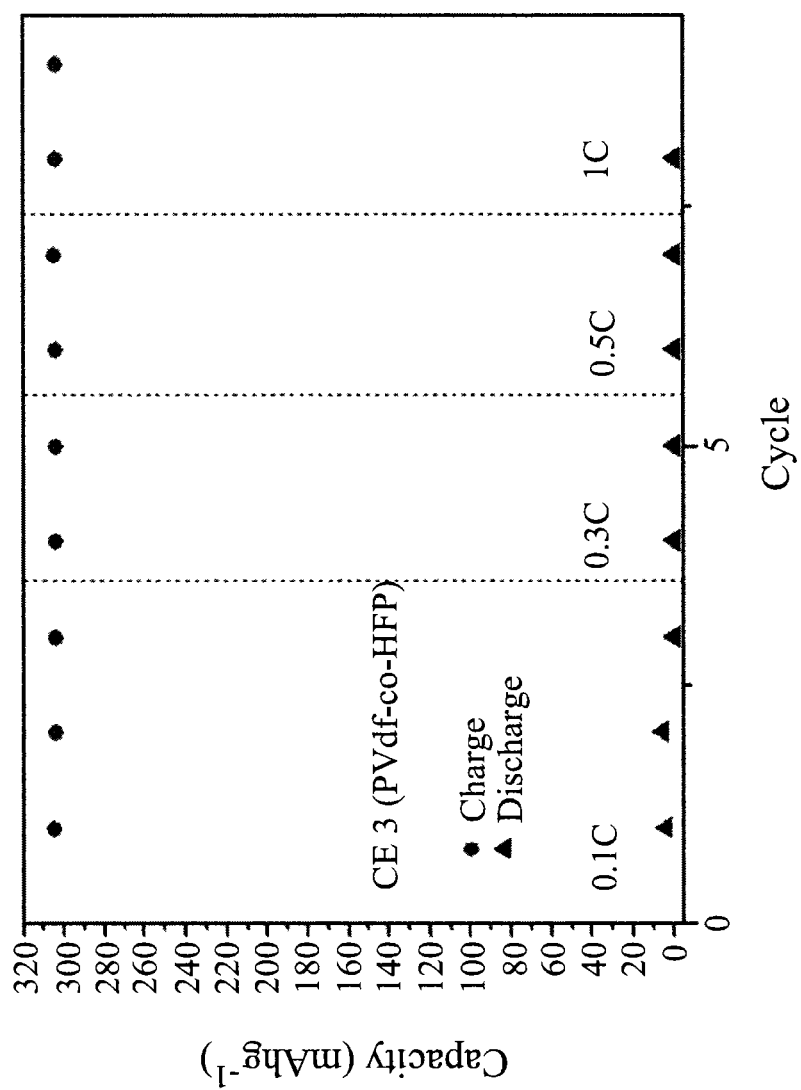
FIG. 12 is a graph plotting capacity versus cycles of a coin cell type battery of Comparative Example 3.
Figure 13A:
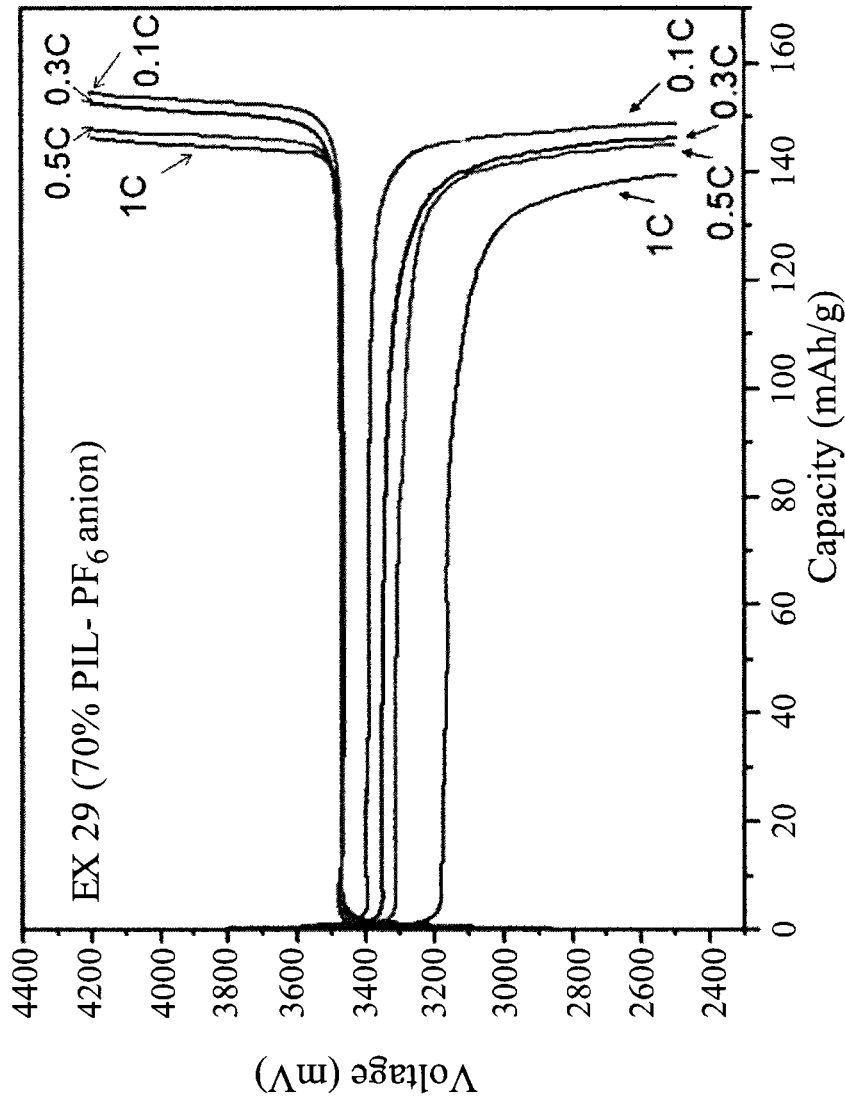
FIGS. 13(A) to 13(D) are charge-discharge curves for coin cell type batteries of Examples 29 to 32, respectively.
Figure 13B:
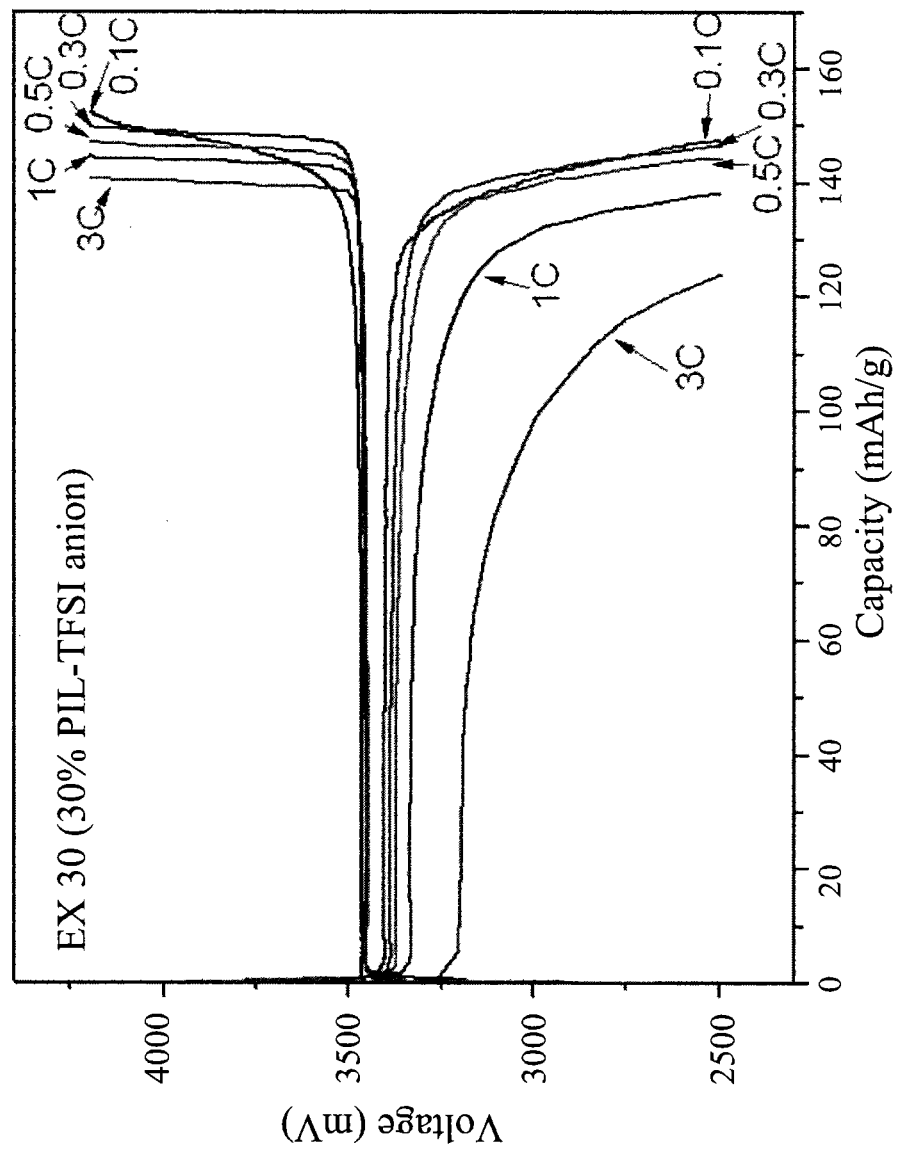
Figure 13C:
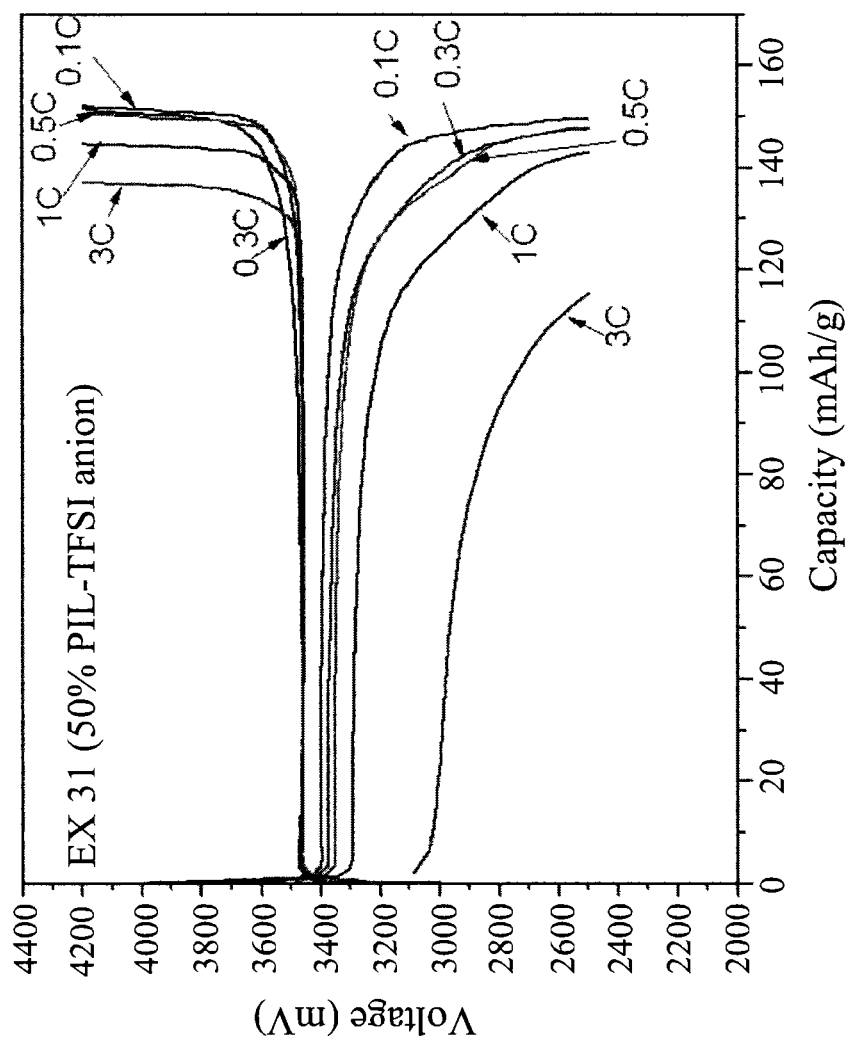
Figure 13D:
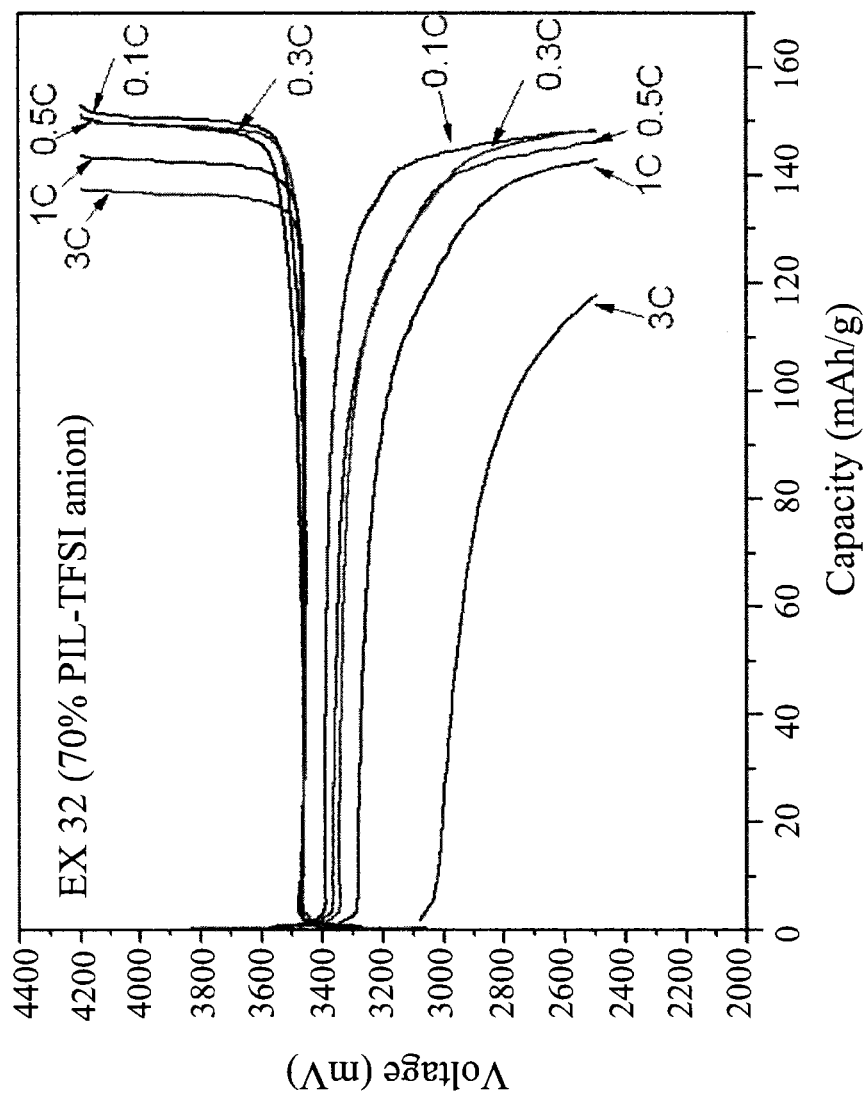

The battery capacity test result for the coin cell type battery of Comparative Example 3 is shown in FIG. 12. It can be seen from FIG. 12 that the coin cell type battery of Comparative Example 3 had a specific discharge capacity close to zero, and could not function as a lithium-ion battery.

The battery capacity test for the coin cell type batteries of Examples 29 to 32 are shown in FIGS. 13(A) to 13(D), respectively. The specific discharge capacities for the coin cell type batteries of Examples 29 to 32 are summarized in Table 4.

TABLE 4

| Discharging rate | Specific discharge capacity (mAhg$^{-1}$) | | | | |
|---|---|---|---|---|---|
| | 0.1 C | 0.3 C | 0.5 C | 1 C | 3 C |
| EX 29 | 148 | 145 | 144 | 139 | — |
| EX 30 | 147 | 146 | 144 | 138 | 123 |
| EX 31 | 146 | 146 | 142 | 133 | 106 |
| EX 32 | 145 | 145 | 141 | 138 | 111 |

The battery capacity test results for the coin cell type batteries of Examples 33 to 37 are shown in Table 5.

TABLE 5

| Discharging rate | Specific discharge capacity (mAhg$^{-1}$) | | | |
|---|---|---|---|---|
| | 0.1 C | 0.3 C | 0.5 C | 1 C |
| EX 33 | 150.7 | 144.4 | 136.2 | 113.5 |
| EX 34 | 158.6 | 151.1 | 144.1 | 121.4 |
| EX 35 | 153.9 | 147.6 | 143.3 | 126.7 |
| EX 36 | 155.3 | 148.8 | 136.9 | 100.4 |
| EX 37 | 151.5 | 139.7 | 135.3 | 124.3 |

It is known in the art that a specific discharge capacity of a lithium-ion battery will decrease with an increase in discharging rate. It can be seen from Table 4 and Table 5 that when the coin cell type batteries of Examples 29 to 37, especially the coin cell type batteries of Examples 29 to 32, discharged at a relatively high discharging rate (1 C or 3 C), the specific discharge capacities thereof were not greatly reduced.

Limiting Oxygen Index Test

Two polymer membranes which were substantially the same were prepared. One of the polymer membranes was soaked in the above-mentioned LiPF$_6$ electrolyte solution for 24 hours in an argon-filled glovebox to obtain a gel polymer electrolyte, but the other was not. For each of the polymer membranes, a limiting oxygen index (LOI), which is the minimum concentration of oxygen that will support combustion of the polymer membrane, was measured using a limiting oxygen index tester (ALTAS). In this test, volume flow rates of oxygen and nitrogen were adjusted until the flame on the polymer membrane just went out. The ratio of the volume flow rate of oxygen to the sum of the volume flow rates of oxygen and nitrogen at this point was then determined as the LOI value.

The LOI values for the polymer membranes of Examples 9 and 12 and the gel polymer electrolytes made therefrom are shown in Table 6.

TABLE 6

| | Example 9 | | Example 12 | |
|---|---|---|---|---|
| | Polymer membrane | Gel polymer electrolyte | Polymer membrane | Gel polymer electrolyte |
| LOI (%) | 46 | 23 | 31 | 29 |

The LOI values shown in Table 6 are all greater than 20%, which is equivalent to the oxygen content in the air. This proves the polymer membranes including the polymeric ionic liquid of Example 1 or 2 are less likely to burn in the air. Especially, the gel polymer electrolyte made by soaking the polymer membrane in a flammable electrolyte still had the LOI value greater than 20%. Therefore, a lithium ion battery having the gel polymer electrolyte can have improved safety.

Positive Electrode Test

Figure 14A:
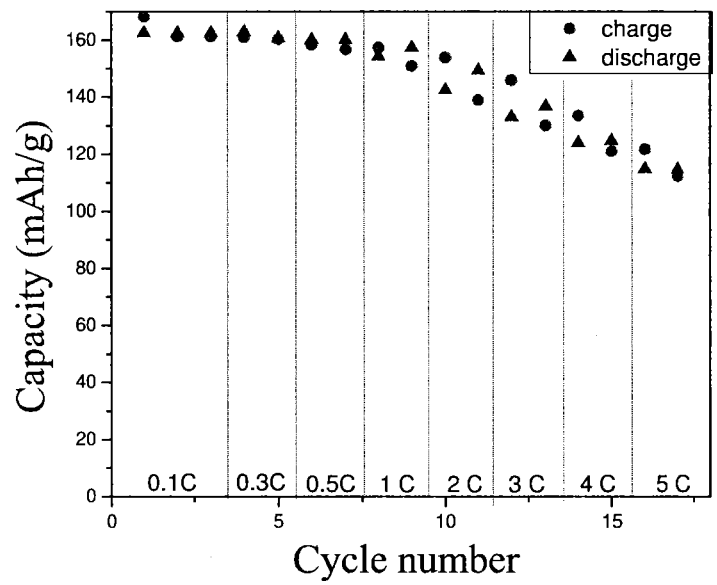
FIGS. 14(A), 14(B), and 14(C) show charge-discharge curves for coin cell type batteries of Examples 38 and 39 and Comparative Example 4, respectively.
Figure 14A:
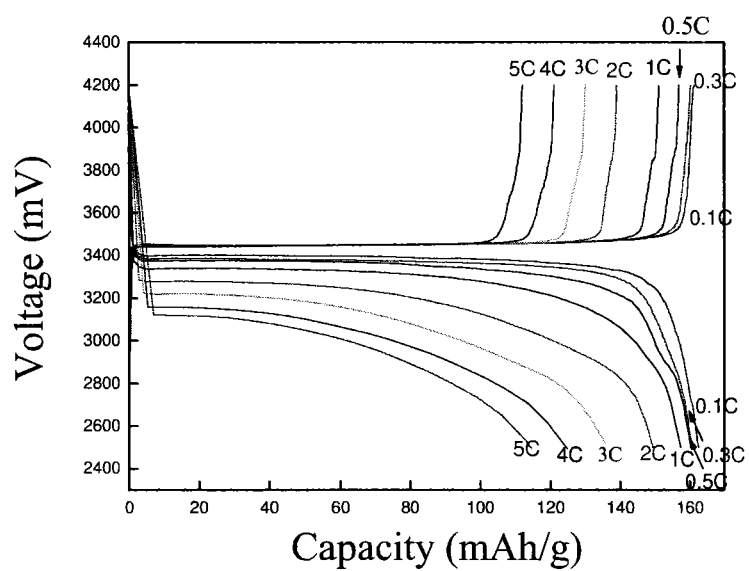
Figure 14B:
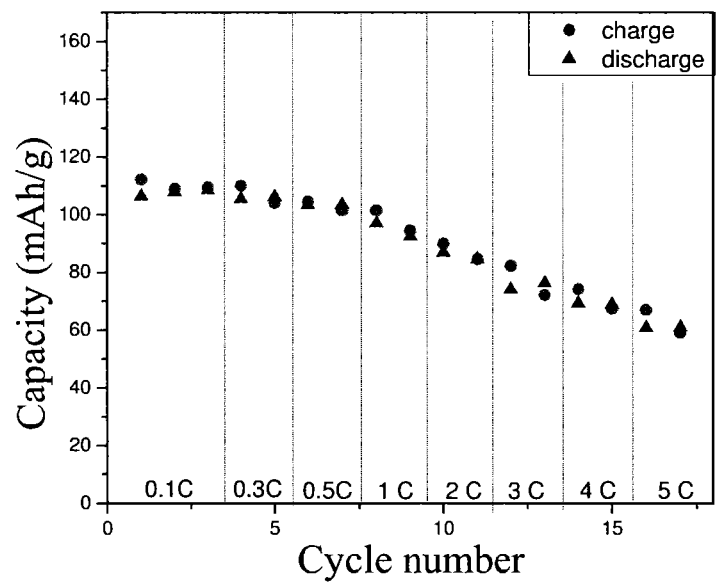
Figure 14B:
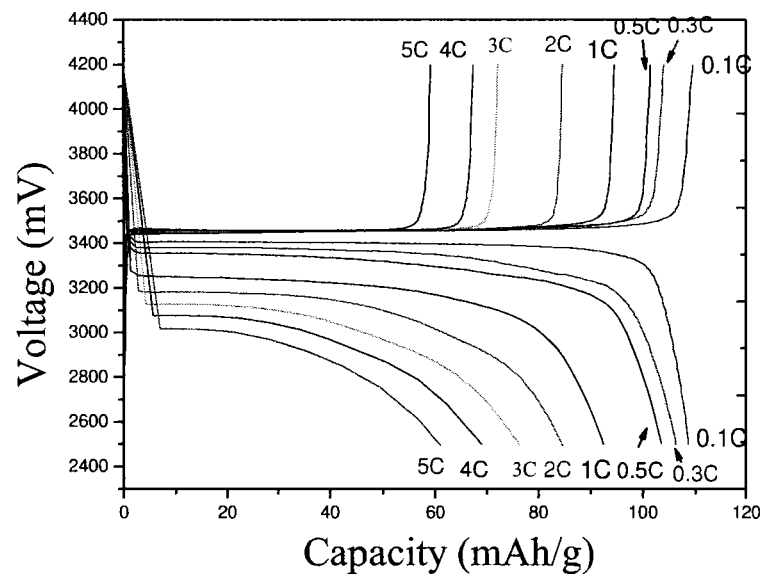
Figure 14C:
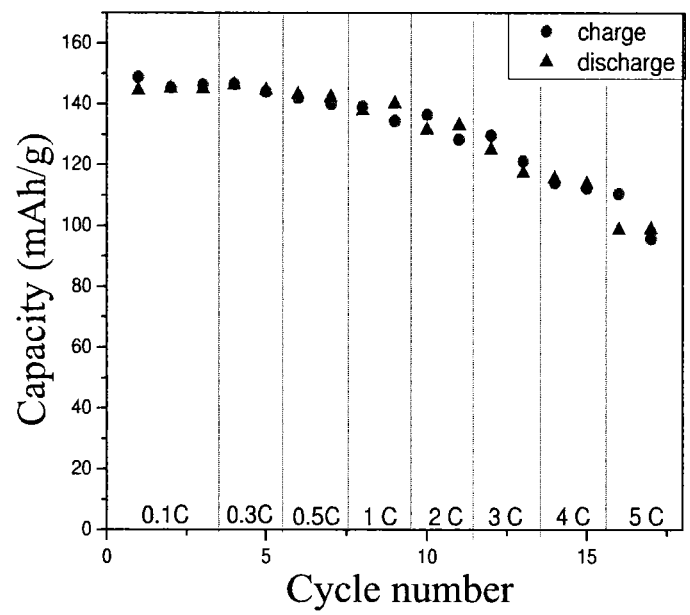
Figure 14C:
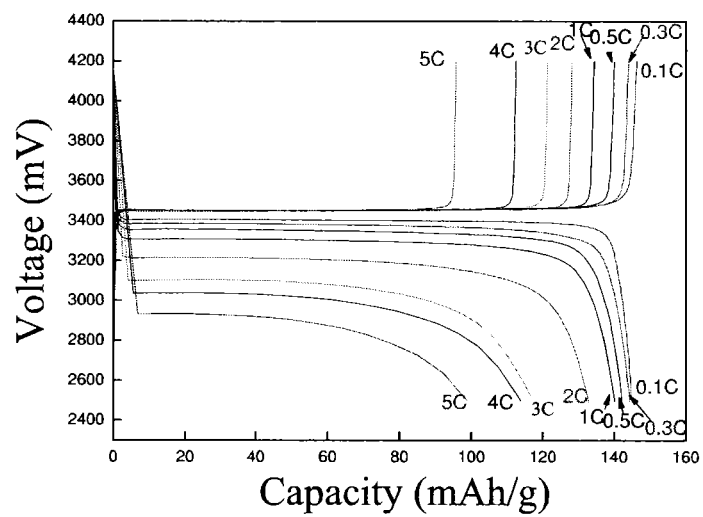

A coin cell type battery was charged at 0.1 C and discharged at different discharging rates (0.1 C, 0.3 C, 0.5 C, 1 C, 2 C, 3 C, 4 C, and 5 C). This test was performed galvanostatically between 2.5 V and 4.0 V at room temperature on a Battery Automation Test system (Acu Tech Systems, BAT-750B). FIGS. 14(A), 14(B), and 14(C) are charge-discharge curves for the coin cell type batteries of Examples 38 and 39 and Comparative Example 4, respectively. The specific discharge capacities for the coin cell type batteries are summarized in Table 7.

TABLE 7

| Discharging rate | Specific discharge capacity (mAhg$^{-1}$) | | | | |
|---|---|---|---|---|---|
| | 0.1 C | 1 C | 2 C | 3 C | 5 C |
| EX 38 | 162 | 157 | 148 | 135 | 114 |
| EX 39 | 108 | 92 | 84 | 76 | 61 |
| CE 4 | 145 | 142 | 132 | 117 | 98 |

It can be noted from Table 7 that when the coin cell type batteries were discharged at a relatively high rate (5 C), the specific discharge capacity of the coin cell type battery of Example 38 was much higher than that of Comparative Example 4. This means that the polymeric ionic liquid (the PIL-TFSI anion) can be used as a binder of a positive electrode for improving the specific discharging capacity of a lithium-ion battery.

Battery Capacity Test—2

Figure 15:
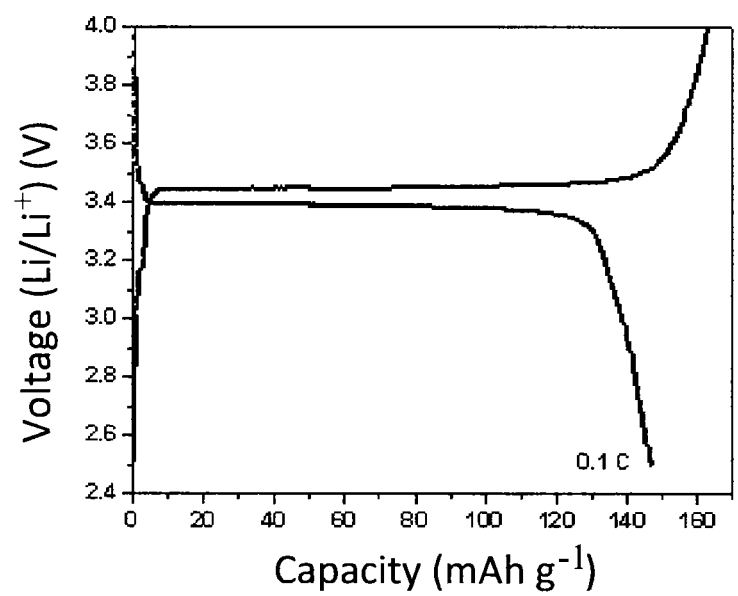
FIG. 15 shows a charge-discharge curve for a coin cell type battery of Example 40.

A coin cell type battery of Example 40 was charged at 0.1 C, followed by discharging at 0.1 C. The battery capacity test result for the coin cell type battery of Example 40 is shown in FIG. 15. As shown in FIG. 15, the specific discharge capacity of the coin cell type battery of Example 40 was about 150 mAhg$^{-1}$.

While the present invention has been described in connection with what are considered the most practical embodiments, it is understood that this invention is not limited to the disclosed embodiments but is intended to cover various arrangements included within the spirit and scope of the broadest interpretations and equivalent arrangements.

What is claimed is:

1. A polymeric ionic liquid having a formula (I) for use as an electrolyte

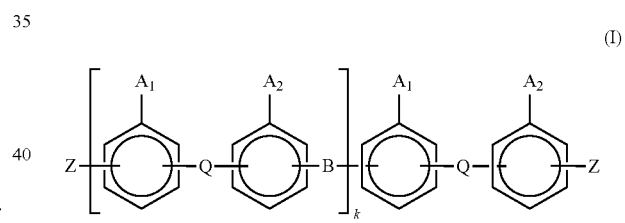

where:

Q is

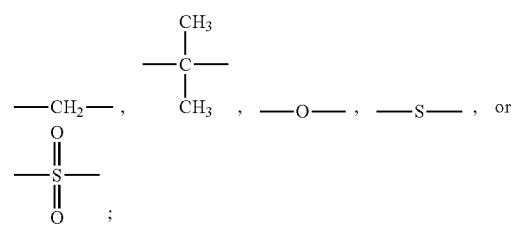

k is an integral greater than zero;

B is

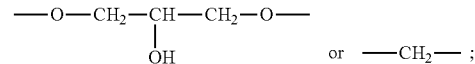

Z is alkyl or a hydrogen atom when each of B and Q is —CH$_2$—, and

Z is

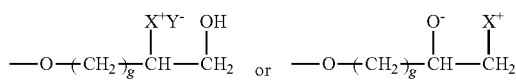

when B is

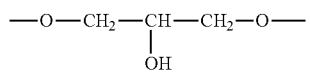

and
A₁ and A₂ are independently selected for each repeating unit, wherein A₁ and A₂ are independently alkyl or a hydrogen atom when B is

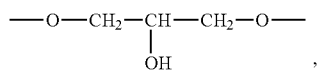

and
wherein A₁ and A₂ are independently

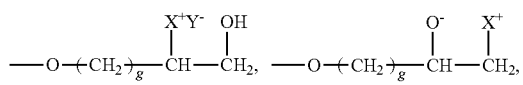

when each of B and Q is —CH₂—,
with the proviso that in at least one repeating unit, at least one of A₁ and A₂ is not

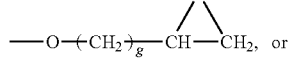

with the proviso that when A₁ is

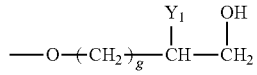

A₂ is not

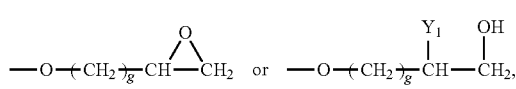

and
with the proviso that when A₁ is

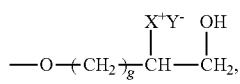

A₂ is not

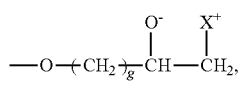

in which g is an integral not less than 1,
Y⁻ is $PF_6^-$, $BF_4^-$,

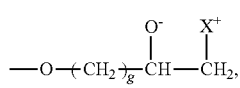

$ClO_4^-$, or a halide anion,
Y₁ is a halogen atom,
and X⁺ is

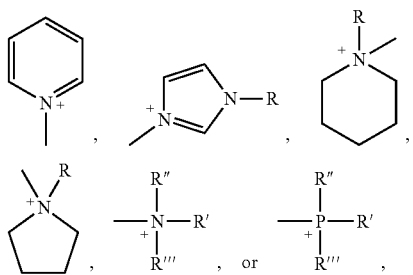

in which R, R′, R″, R‴ are each independently —CH₃, —CH₂CH₃, —CH₂CH₂CH₃, —CH₂CH₂CH₂CH₃, —CH₂CH₂OCH₃, or —CH₂CH₂OCH₂CH₂OCH₃.

2. The polymeric ionic liquid according to claim 1, wherein Q is

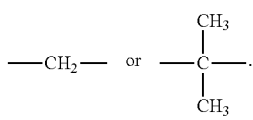

3. The polymeric ionic liquid according to claim 2, wherein each of B and Q is —CH₂—, A₁ and A₂ being independently

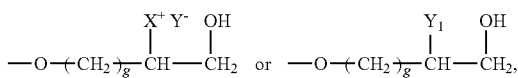

and
Z being a hydrogen atom.

4. A process for producing a polymeric ionic liquid according to claim 1, comprising the steps of:
(a) preparing a phenolic epoxy resin having a formula (III)

(III)

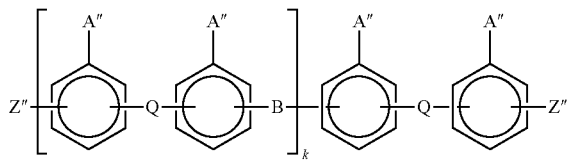

where
Q is

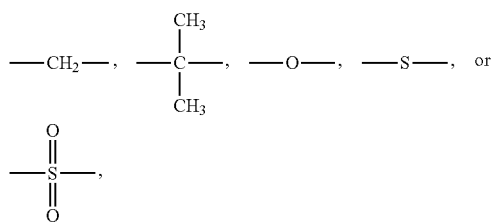

k is an integral greater than zero,
B is

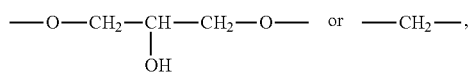

A" is alkyl or a hydrogen atom when B is

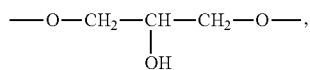

and is

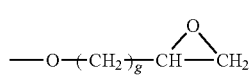

when each of B and Q is —CH₂—, in which g is an integral not less than 1, and
Z" is alkyl or a hydrogen atom when each of B and Q is —CH₂—, and is

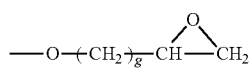

when B is

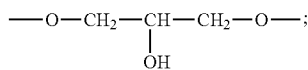

and (b) subjecting the phenolic epoxy resin to a ring opening reaction using a first compound which is selected from the group consisting of hydrogen halide, substituted or non-substituted pyridine, substituted or non-substituted imidazole, substituted or non-substituted piperidine, substituted or non-substituted pyrrolidine, tertiary amine, tertiary phosphine, and combinations thereof.

5. The process according to claim 4, wherein in step (b), the first compound is hydrogen halide, and is used in the ring opening reaction to thereby obtain an intermediate polymer, the process further comprising the step (c) of reacting the intermediate polymer with a second compound to obtain a polymeric ionic liquid precursor, the second compound being selected from the group consisting of substituted or non-substituted pyridine, substituted or non-substituted imidazole, substituted or non-substituted piperidine, substituted or non-substituted pyrrolidine, tertiary amine, tertiary phosphine, and combinations thereof.

6. The process according to claim 5, further comprising the step (d) of subjecting the polymeric ionic liquid precursor to an anion replacement reaction using an alkali metal salt so as to obtain a polymeric ionic liquid.

7. The process according to claim 6, wherein the alkali metal salt is selected from the group consisting of potassium hexafluorophosphate (KPF$_6$), bis(trifluoromethane)sulfonimide lithium salt (LiTFSI), lithium tetrafluoroborate (LiBF$_4$), dodecylbenzene sulfonic acid sodium salt (NaDBSA), lithium trifluoromethanesulfonate (LiCF$_3$SO$_3$), and combinations thereof.

8. The process according to claim 7, wherein the alkali metal salt is potassium hexafluorophosphate (KPF$_6$) or bis(trifluoromethane)sulfonimide lithium salt (LiTFSI).

9. A process for preparing a gel polymer electrolyte, comprising a step of soaking a polymer membrane including the polymeric ionic liquid as claimed in claim 1, with a lithium-ion containing electrolyte.

10. The process according to claim 9, wherein the lithium-ion containing electrolyte includes lithium hexafluorophosphate.

11. A binder for a lithium battery electrode, comprising the polymeric ionic liquid as claimed in claim 1.

* * * * *